(12) United States Patent
Baldwin et al.

(10) Patent No.: US 7,733,617 B2
(45) Date of Patent: Jun. 8, 2010

(54) SELF TESTING DIGITAL FAULT INTERRUPTER

(75) Inventors: John R. Baldwin, Newtown, CT (US); Sorin I. Mortun, Irvington, NY (US); Daming Yu, Easton, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/198,400

(22) Filed: Aug. 8, 2005

(65) Prior Publication Data

US 2007/0030608 A1    Feb. 8, 2007

(51) Int. Cl.
*H02H 3/00* (2006.01)
(52) U.S. Cl. ........................................ 361/42
(58) Field of Classification Search ............... 361/42
See application file for complete search history.

(56) References Cited

U.S. PATENT DOCUMENTS

| | | | |
|---|---|---|---|
| 3,403,238 A | 9/1968 | Buehler et al. |
| 3,629,766 A | 12/1971 | Gould et al. |
| 3,683,302 A | 8/1972 | Butler et al. |
| 3,736,468 A | 5/1973 | Reeves et al. |
| 3,787,708 A | 1/1974 | Hobson, Jr. |
| 3,852,642 A | 12/1974 | Engel et al. |
| 3,859,567 A | 1/1975 | Allard |
| 3,898,557 A | 8/1975 | Strock |
| 3,932,790 A | 1/1976 | Muchnick |
| 3,936,699 A | 2/1976 | Adams |
| 3,943,409 A | 3/1976 | Brown |
| 3,976,918 A | 8/1976 | Clark |
| 4,002,951 A | 1/1977 | Halbeck |
| 4,024,436 A | 5/1977 | Adams |
| 4,031,431 A | 6/1977 | Gross |
| 4,045,822 A | 8/1977 | Schade, Jr. |
| 4,051,544 A | 9/1977 | Vibert |
| 4,063,299 A | 12/1977 | Munroe |
| 4,161,023 A * | 7/1979 | Goffeau ................... 363/124 |
| 4,216,515 A | 8/1980 | Van Zeeland |
| 4,216,516 A | 8/1980 | Howell |

(Continued)

FOREIGN PATENT DOCUMENTS

DE    42 05 208    8/1993

(Continued)

OTHER PUBLICATIONS

Fairchild Semiconductor TM, RV4145A, "Low Power Ground Fault Interrupter", REV. 1.0.3.3/6/02, www.fairchildsemi.com.

*Primary Examiner*—Stephen W Jackson
*Assistant Examiner*—Tien Mai
(74) *Attorney, Agent, or Firm*—Mark S. Bicks; Alfred N. Goodman; Kevin M. Barner

(57) ABSTRACT

A self testing fault detector having a line side and a load side and a conductive path there between. The apparatus includes a solenoid, which is adapted to move a plurality of contacts disposed in the conductive path from a first position to a second position when the self testing device is powered from the line side; and a processor, which is adapted to energize the solenoid using a first switch and maintain said solenoid in the energized state using a second switch.

28 Claims, 27 Drawing Sheets

U.S. PATENT DOCUMENTS

| | | | |
|---|---|---|---|
| 4,255,773 A | 3/1981 | Jabbal | |
| 4,345,289 A | 8/1982 | Howell | |
| 4,353,103 A | 10/1982 | Whitlow | |
| 4,368,498 A | 1/1983 | Neuhouser | |
| 4,412,193 A | 10/1983 | Bienwald et al. | |
| 4,473,859 A | 9/1984 | Stone et al. | |
| 4,538,040 A | 8/1985 | Ronemus et al. | |
| 4,549,241 A | 10/1985 | Morris et al. | |
| 4,567,544 A | 1/1986 | Ronemus et al. | |
| 4,568,997 A | 2/1986 | Bienwald et al. | |
| 4,574,324 A | 3/1986 | Packard | |
| 4,581,484 A * | 4/1986 | Bendig | 379/88.13 |
| 4,595,894 A | 6/1986 | Doyle et al. | |
| 4,618,907 A | 10/1986 | Leopold | |
| 4,685,022 A | 8/1987 | Nichols, III et al. | |
| 4,709,293 A | 11/1987 | Gershen et al. | |
| 4,714,975 A | 12/1987 | Dvorak | |
| 4,742,422 A | 5/1988 | Tigges | |
| 4,802,052 A | 1/1989 | Brant et al. | |
| 4,816,957 A | 3/1989 | Irwin | |
| 4,829,390 A | 5/1989 | Simon | |
| 4,831,496 A | 5/1989 | Brant et al. | |
| 4,833,564 A | 5/1989 | Pardue et al. | |
| 4,872,087 A | 10/1989 | Brant | |
| 4,939,615 A | 7/1990 | Brant et al. | |
| 5,166,853 A | 11/1992 | Gershen et al. | |
| 5,184,271 A | 2/1993 | Doyle et al. | |
| 5,202,662 A | 4/1993 | Bienwald et al. | |
| 5,223,810 A | 6/1993 | Van Haaren | |
| 5,224,006 A * | 6/1993 | MacKenzie et al. | 361/45 |
| 5,270,896 A | 12/1993 | McDonald | |
| 5,270,897 A | 12/1993 | McDonald et al. | |
| 5,334,939 A | 8/1994 | Yarbrough | |
| 5,363,269 A | 11/1994 | McDonald | |
| 5,394,289 A | 2/1995 | Yao et al. | |
| 5,402,298 A | 3/1995 | Gershen et al. | |
| 5,406,436 A | 4/1995 | Doyle et al. | |
| 5,418,678 A * | 5/1995 | McDonald | 361/46 |
| 5,459,630 A | 10/1995 | MacKenzie et al. | |
| 5,475,609 A | 12/1995 | Apothaker | |
| 5,477,412 A | 12/1995 | Neiger et al. | |
| 5,510,760 A | 4/1996 | Marcou et al. | |
| 5,541,800 A | 7/1996 | Misencik | |
| 5,600,524 A | 2/1997 | Neiger et al. | |
| 5,642,052 A | 6/1997 | Earle | |
| 5,706,155 A | 1/1998 | Neiger et al. | |
| 5,715,125 A | 2/1998 | Neiger et al. | |
| 5,729,417 A | 3/1998 | Neiger et al. | |
| 5,844,759 A | 12/1998 | Hirsh et al. | |
| 5,943,198 A | 8/1999 | Hirsh et al. | |
| 5,963,406 A | 10/1999 | Neiger et al. | 361/42 |
| 5,963,408 A | 10/1999 | Neiger et al. | |
| 5,966,280 A | 10/1999 | Cerminara et al. | |
| 5,973,896 A | 10/1999 | Hirsh et al. | |
| 5,978,191 A | 11/1999 | Bonniau et al. | |
| 6,016,244 A | 1/2000 | Gershen et al. | 361/50 |
| 6,021,034 A | 2/2000 | Chan et al. | 361/42 |
| 6,040,967 A | 3/2000 | DiSalvo | |
| 6,052,265 A | 4/2000 | Zaretsky et al. | |
| 6,088,205 A | 7/2000 | Neiger et al. | 361/42 |
| 6,097,580 A | 8/2000 | Zaretsky | 361/42 |
| 6,111,733 A | 8/2000 | Neiger et al. | |
| 6,128,169 A | 10/2000 | Neiger et al. | 361/42 |
| 6,176,717 B1 | 1/2001 | Campolo et al. | 439/181 |
| 6,226,161 B1 | 5/2001 | Neiger et al. | 361/45 |
| 6,246,558 B1 | 6/2001 | DiSalvo et al. | 361/42 |
| 6,252,407 B1 | 6/2001 | Gershen | 324/509 |
| 6,262,871 B1 | 7/2001 | Nemir et al. | 361/42 |
| 6,587,319 B1 | 7/2003 | Finlay | 361/42 |
| 6,807,035 B1 | 10/2004 | Baldwin et al. | |
| 6,807,036 B2 * | 10/2004 | Baldwin | 361/42 |
| 6,873,158 B2 * | 3/2005 | Macbeth | 324/509 |
| 7,030,769 B2 * | 4/2006 | Miller | 340/635 |
| 7,443,309 B2 * | 10/2008 | Baldwin et al. | 340/650 |
| 2002/0180451 A1 * | 12/2002 | Leopold et al. | 324/509 |
| 2004/0252425 A1 * | 12/2004 | Baldwin et al. | 361/42 |
| 2005/0024102 A1 * | 2/2005 | Kondo | 327/110 |

FOREIGN PATENT DOCUMENTS

WO     WO 0074192     12/2000

* cited by examiner

400

402

RED LED CONTINUES TO FLASH.

THE CONTACTS CLOSE (IF THE GFCI STILL HAS THIS FUNCTIONAL CAPABILITY) IN ORDER TO RESTORE POWER TO THE FACE AND LOAD. THE LED FLASH RATE IS INCREASED.

NOTE: CLOSING THE CONTACTS AND INCREASING THE FLASH RATE ARE THE ONLY ACTIONS THAT CAN RESULT FROM A PRESS OF THE RESET BUTTON AND THEY CAN OCCUR WHEN THERE IS NO GROUND FAULT SIGNAL PRESENT AND THE GFCI IS NOT OPERATING PROPERLY.

NOTE: A FLASHING LED. ALWAYS MEANS A NON-FUNCTIONING GFCI, WHETHER IT IS FLASHING 'SLOW' OR 'FAST.'

FIG. 26

SELF TESTING DIGITAL FAULT INTERRUPTER

CROSS-REFERENCE TO RELATED APPLICATION

Related subject matter is disclosed in U.S. Non-provisional Patent Application of John R. Baldwin et al., filed on Jun. 16, 2003, Ser. No. 10/461,874, entitled "SELF TESTING GROUND DIGITAL FAULT INTERRUPTER", U.S. Provisional Patent Application of John R. Baldwin et al., filed on Aug. 8, 2005, Ser. No. 60/706,035, entitled "SELF TESTING GROUND FAULT CIRCUIT INTERRUPTER (GFCI) WITH END OF LIFE (EOL) DETECTION THAT REJECTS FALSE EOL INFORMATION", U.S. Non-provisional Patent Application of Stephen M. Liscinsky III, filed on Aug. 8, 2005, Ser. No. 11/198,388, entitled "SELF TESTING GROUND FAULT CIRCUIT INTERRUPTER (GFCI) END OF LIFE (EOL) STATUS INDICATOR", the entire contents of said applications being incorporated herein by reference.

FIELD OF THE INVENTION

The present invention relates generally to a self testing fault interrupting device, such as a ground fault circuit interrupter or an arc fault circuit interrupter. More particularly, the present invention relates to a self testing fault interrupting device where at least one of a daily or a once a minute self test is performed automatically and independently of a manual test.

BACKGROUND OF THE INVENTION

Fault interrupting devices are designed to trip in response to the detection of a fault condition at an AC load. The fault condition can result when a person comes into contact with the hot side of the AC load and an earth ground, a situation which can result in serious injury. A ground fault circuit interrupter (GFCI) detects this condition by using a sense transformer to detect an imbalance between the currents flowing in the line and neutral conductors of the AC supply, as will occur when some of the current on the load hot side is being diverted to ground. When such an imbalance is detected, a relay or circuit breaker within the GFCI device is immediately tripped to an open condition, thereby removing all power from the load.

Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the required threshold level of differential current when a line-to-ground fault occurs.

A ground fault is not the only class of potentially dangerous abnormal operating conditions. Another type of undesirable operating condition occurs when an electrical arc jumps between two conductors or from one conductor to ground also known as an arcing path. This spark represents an electrical discharge through the air and is objectionable because heat is produced as an unintentional by-product of the arcing. Such arcing faults are a leading cause of electrical fires.

Arcing faults can occur in the same places that ground faults occur; in fact, a ground fault would be called an arcing fault if it resulted in an electrical discharge, or arc, across an air gap. A device known as an arc fault circuit interrupter (AFCI) can prevent many classes of arcing faults. Both GFCIs and AFCIs are referred to as fault protection devices.

Prior art self testing fault protection devices typically provide a self test which replaces a user having to perform manual tests at fixed periods of time, for example, weekly, monthly, and so on. Because the user relies on the self testing fault protection device to perform self-tests, the user may have a false sense of security. For example, many self testing fault protection devices only test for electronic operation and do not test for the opening and closing of contacts of the self testing fault protection device. If there is a defect with a component other than the electronics, a user can believe that the device is providing fault protection and can inadvertently be injured.

Also, as a solenoid of a fault protection device is operated over time, the semiconductor that is used to operate the solenoid can become degraded to a point where it approaches failure. This occurs because a 500 volt transient is placed across the transistor every time the solenoid is deenergized. Many manufacturers of fault protection devices place a diode between the solenoid and transistor. The diode is referred to as a suppressor diode. However, placing a suppressor diode across the solenoid or from the transistor collector to ground significantly lengthens the time to open contacts to break a conductive path. Since a life may be involved, time is of the essence regarding quickly opening the contacts of the fault protection device.

Another problem with conventional fault protection devices is that their load or feed-through terminals are hard wired to the face receptacles of the GFCI or AFCI. Therefore, if a user miswires the GFCI or AFCI by connecting the hot and neutral lines to the load terminals and equipment is plugged into the GFCI or AFCI via the face receptacles, the face receptacles can still be powered even if the GFCI or AFCI is in a tripped or off state. This can lead to potential injury to the user because the user would be under the impression that the GFCI or AFCI is in a tripped condition that always provides protection.

Still another problem with conventional fault protection devices is that electrical sparks associated with the input power line sometimes occur when the contacts of the protection device close. The high temperatures associated with the electrical sparks sometimes deteriorate the non-metallic housing of the protection device. Current solutions such as making the walls of the protection device thicker are not cost effective.

Thus, there is a need for a fault protection device which allows for a quick response in opening the contacts of the fault protection device without damaging the transistor or adding a delay in responding to a fault condition.

Still yet another need exists for a fault protection device that has face receptacles that are isolated from the load terminals.

Still another need exists for a fault protection device that allows the fault protection device to self-test without providing a momentary interruption in power to current sensitive equipment.

A further need exists for a structural housing that is resistant to burning or melting from the high temperatures related to electrical arcs. The structure should also provide an arrangement that maximizes space on a printed circuit board.

SUMMARY OF THE INVENTION

An embodiment of the present invention provides a self testing fault detector having a line side and a load side and a conductive path therebetween. The apparatus includes a solenoid which is adapted to move a plurality of contacts disposed in the conductive path from a first position to a second position when the self testing device is powered from the line side, and a processor which is adapted to energize the solenoid using a first switch and maintain said solenoid in the energized state using a second switch.

BRIEF DESCRIPTION OF THE DRAWINGS

These and other aspects, advantages and novel features of the invention will be more readily appreciated from the following detailed description when read in conjunction with the accompanying drawings, in which:

FIG. 26 is a flow chart of an example of a method of a reset button operation with the GFCI device in accordance with an embodiment of the present invention.

DETAILED DESCRIPTION OF EXEMPLARY EMBODIMENTS

Figure 1:
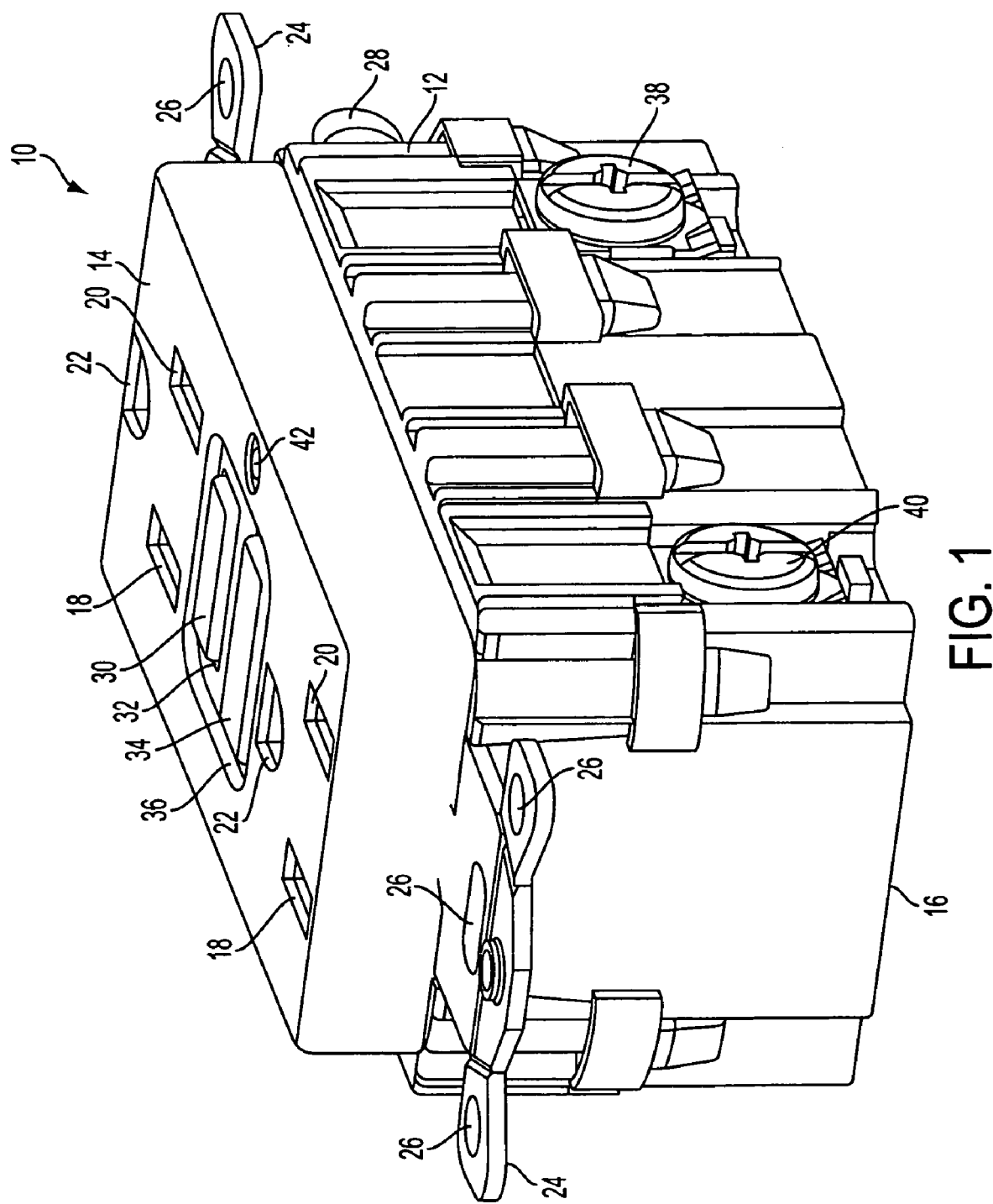
FIG. 1 is a perspective view of an exemplary ground fault circuit interrupter (GFCI) device constructed in accordance with an embodiment of the present invention.
Figure 12:
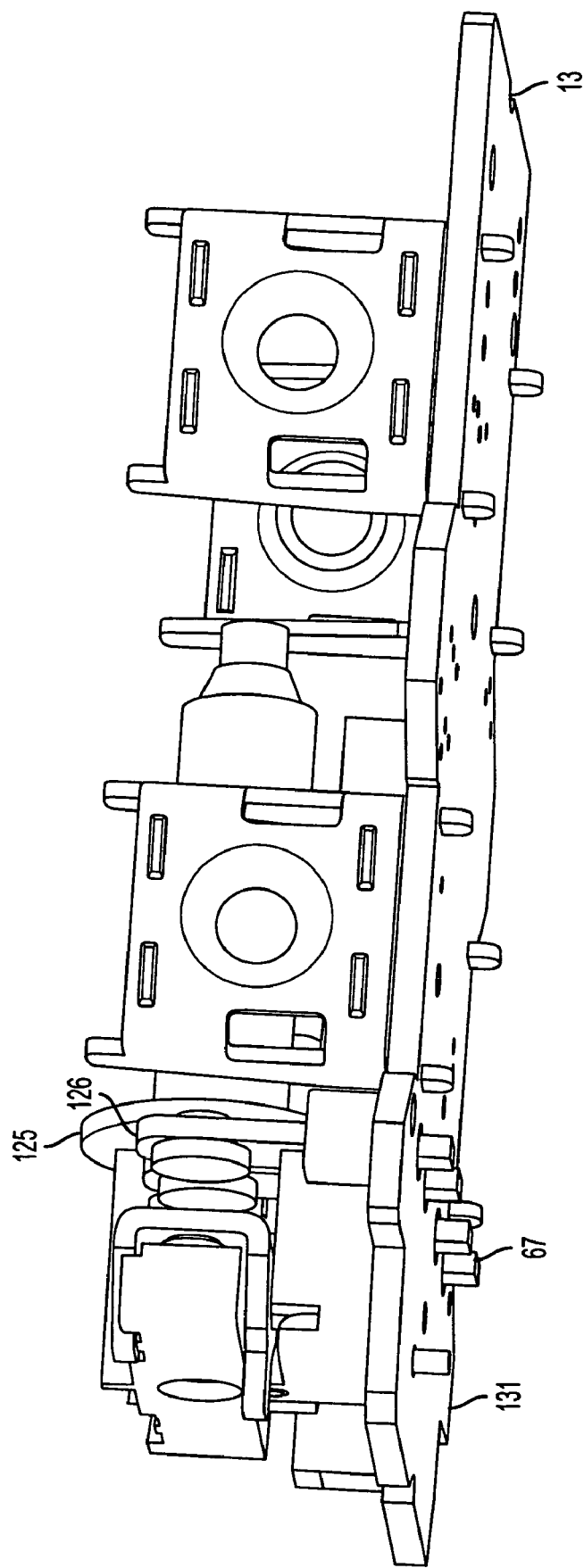
Figure 13:
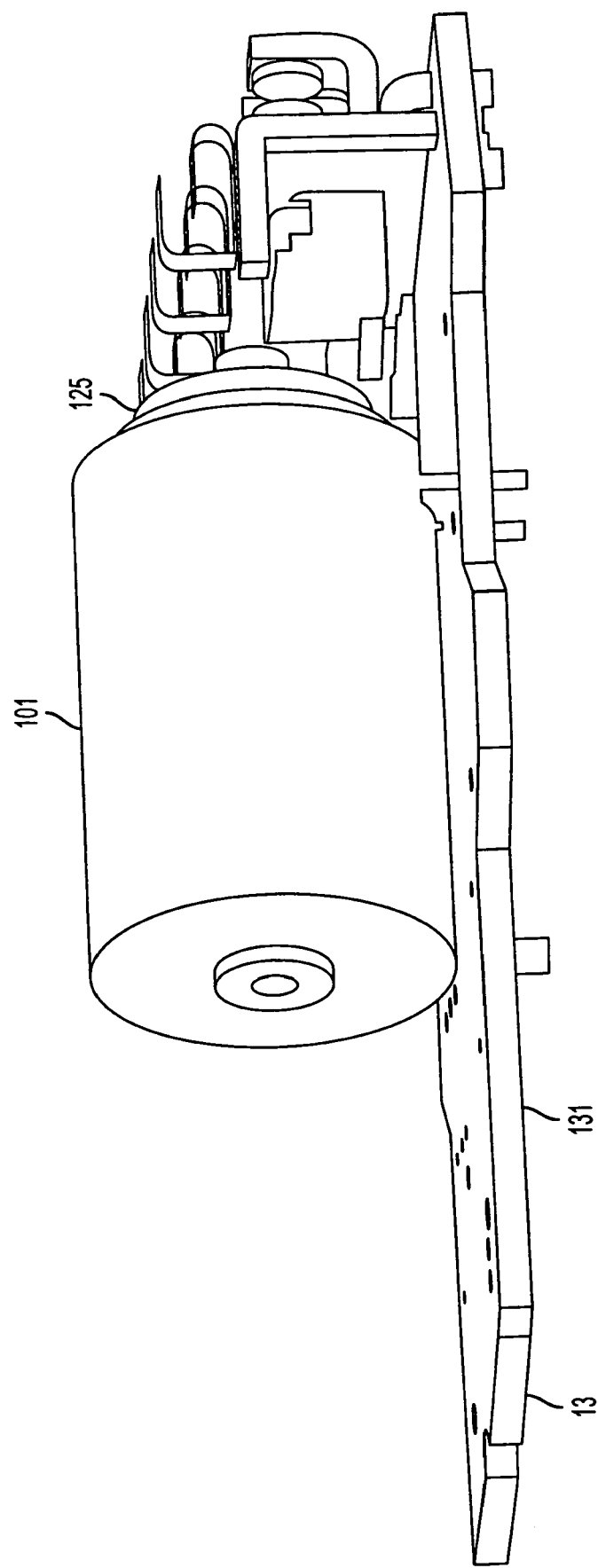
Figure 14:
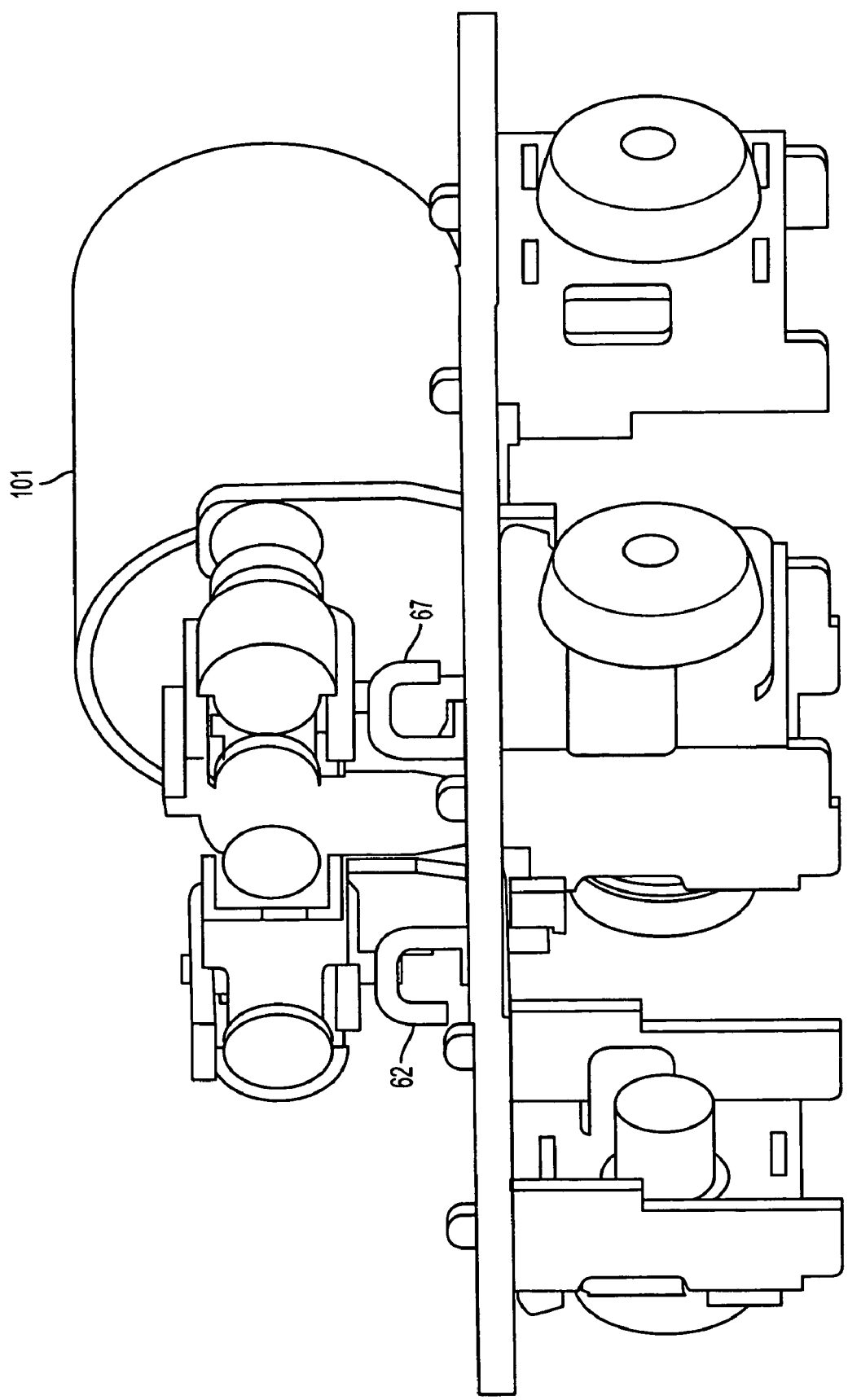
Figure 15:
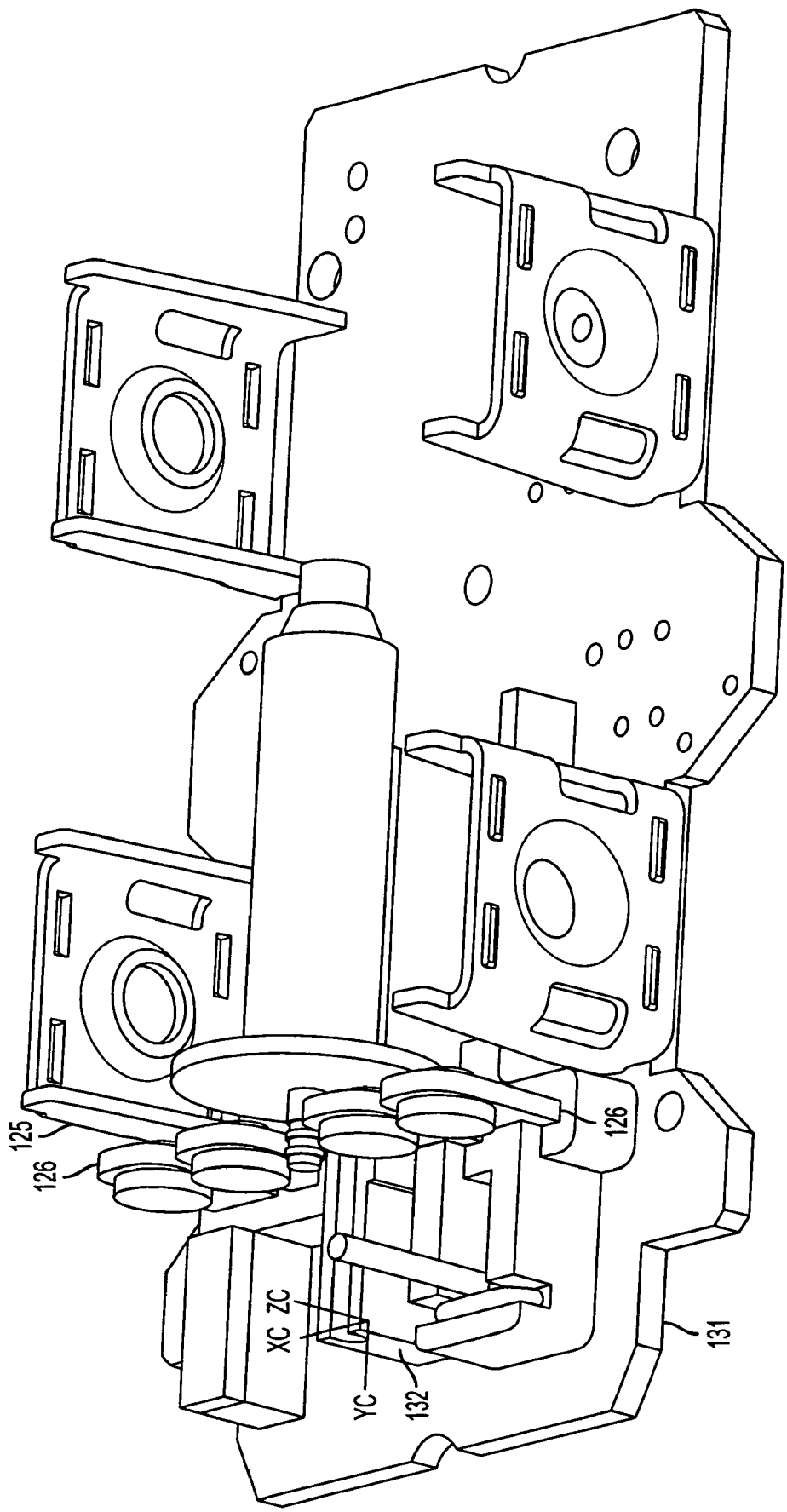
Figure 16:
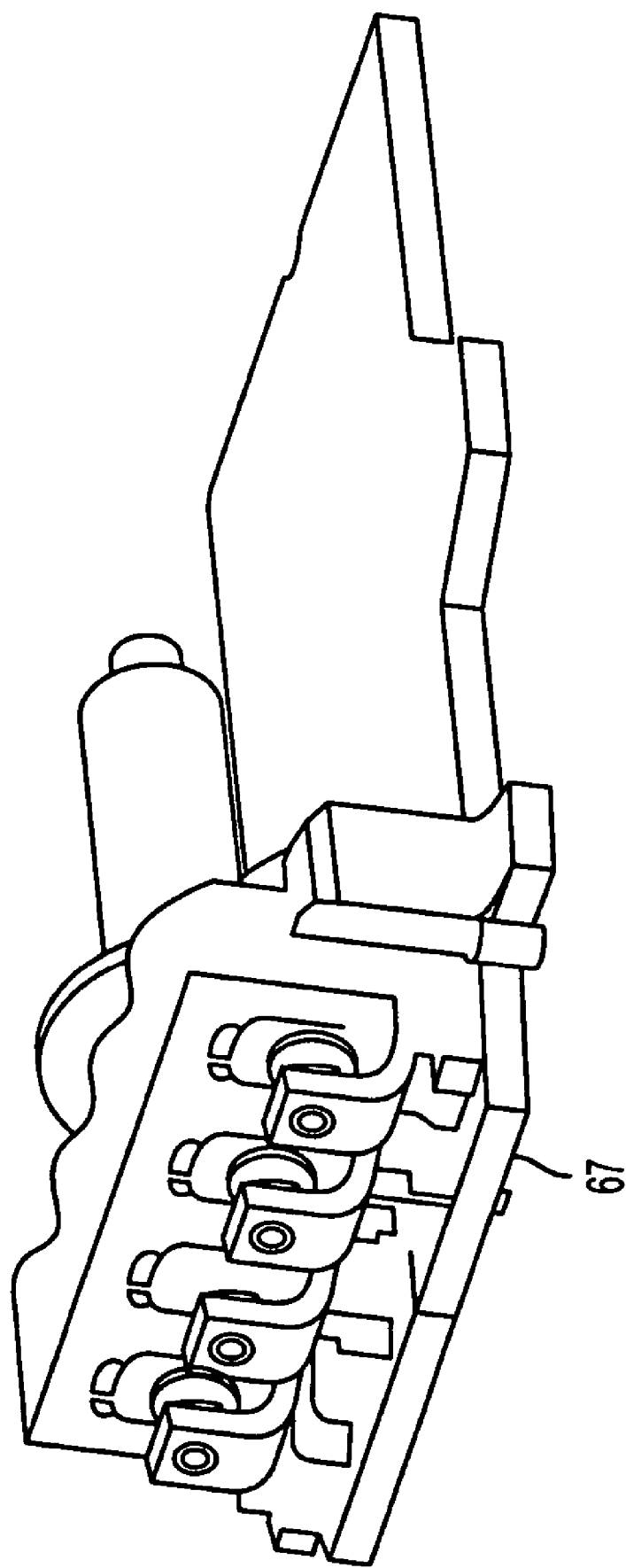
Figure 17:
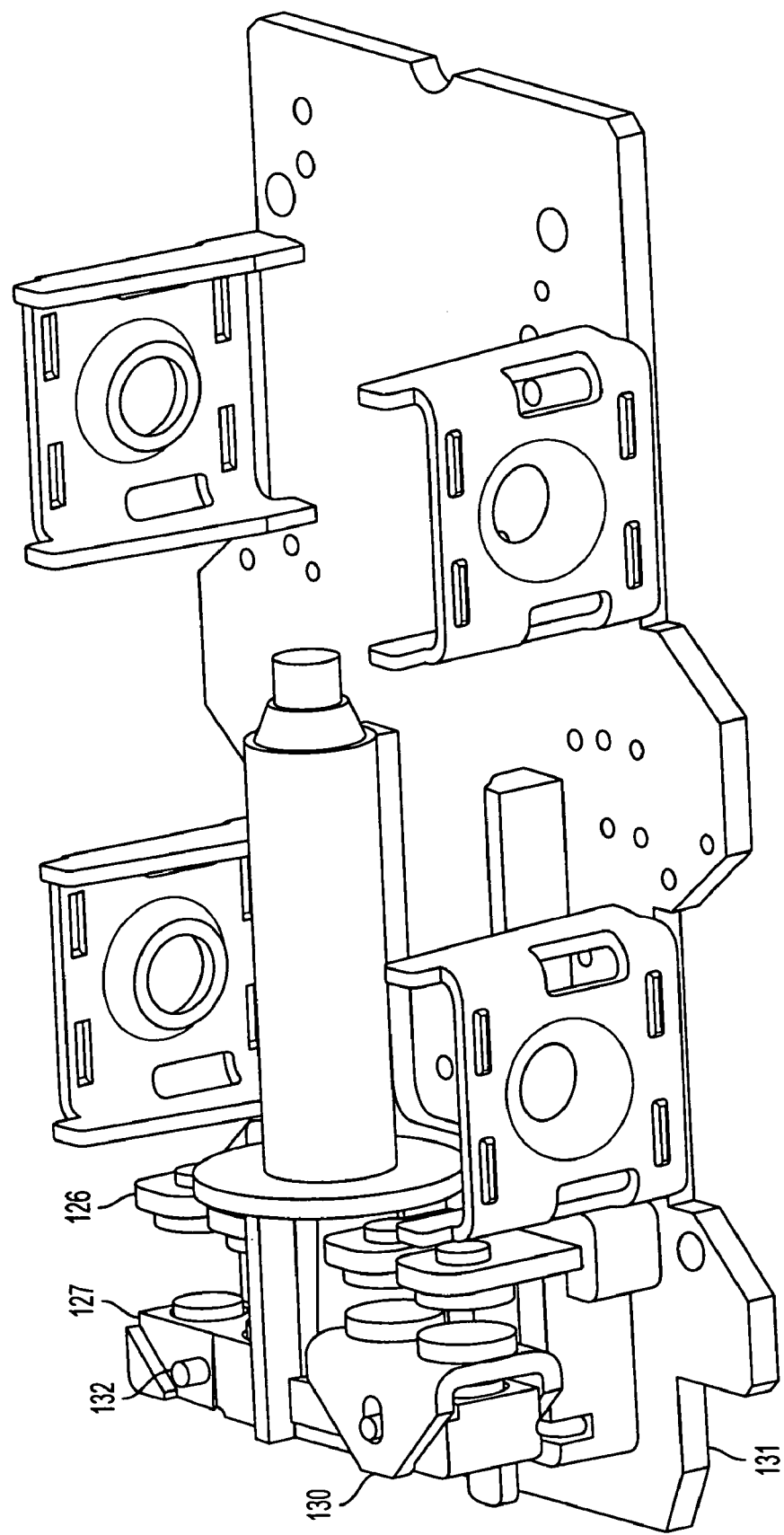
Figure 18:
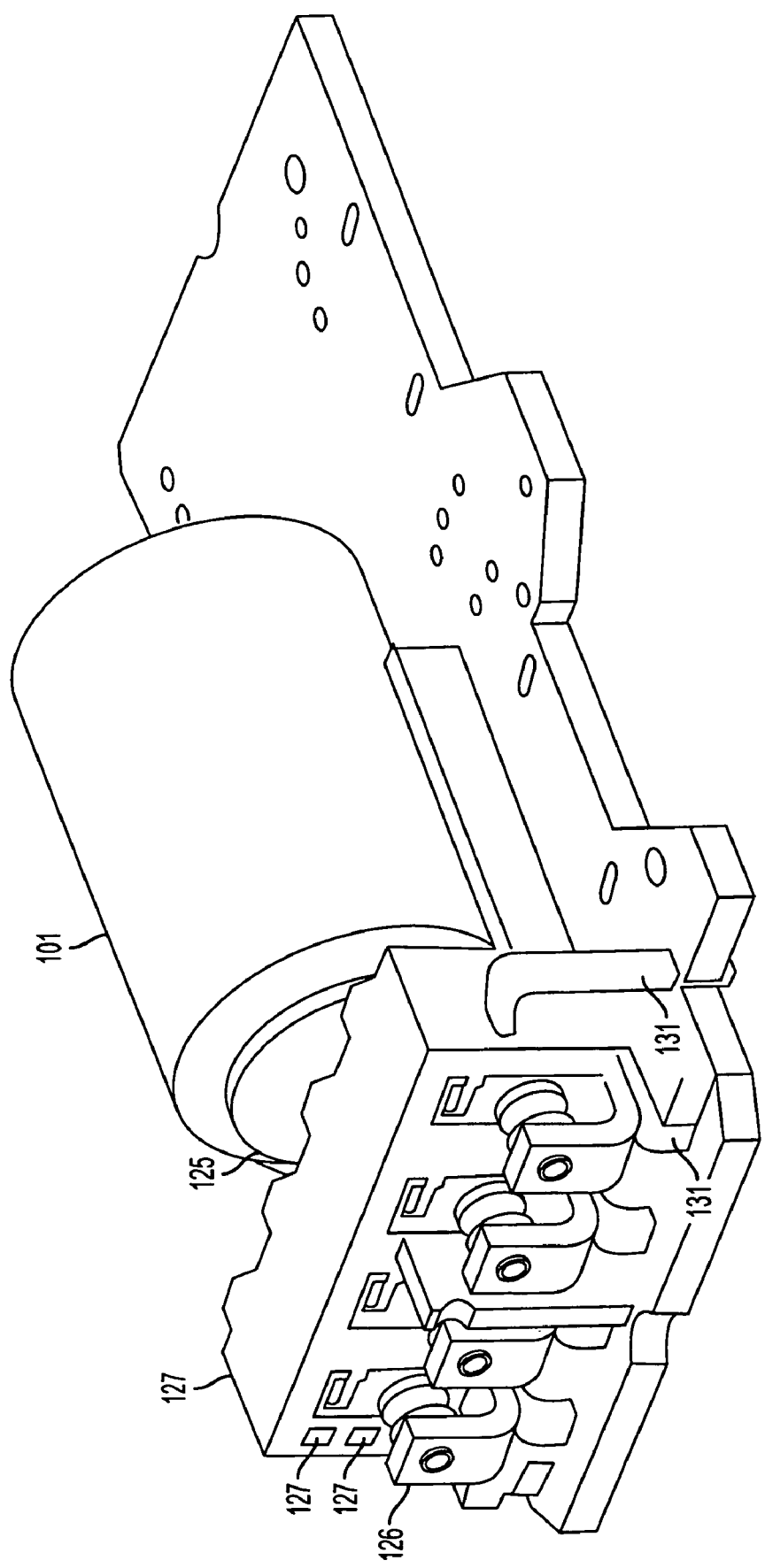
Figure 19:
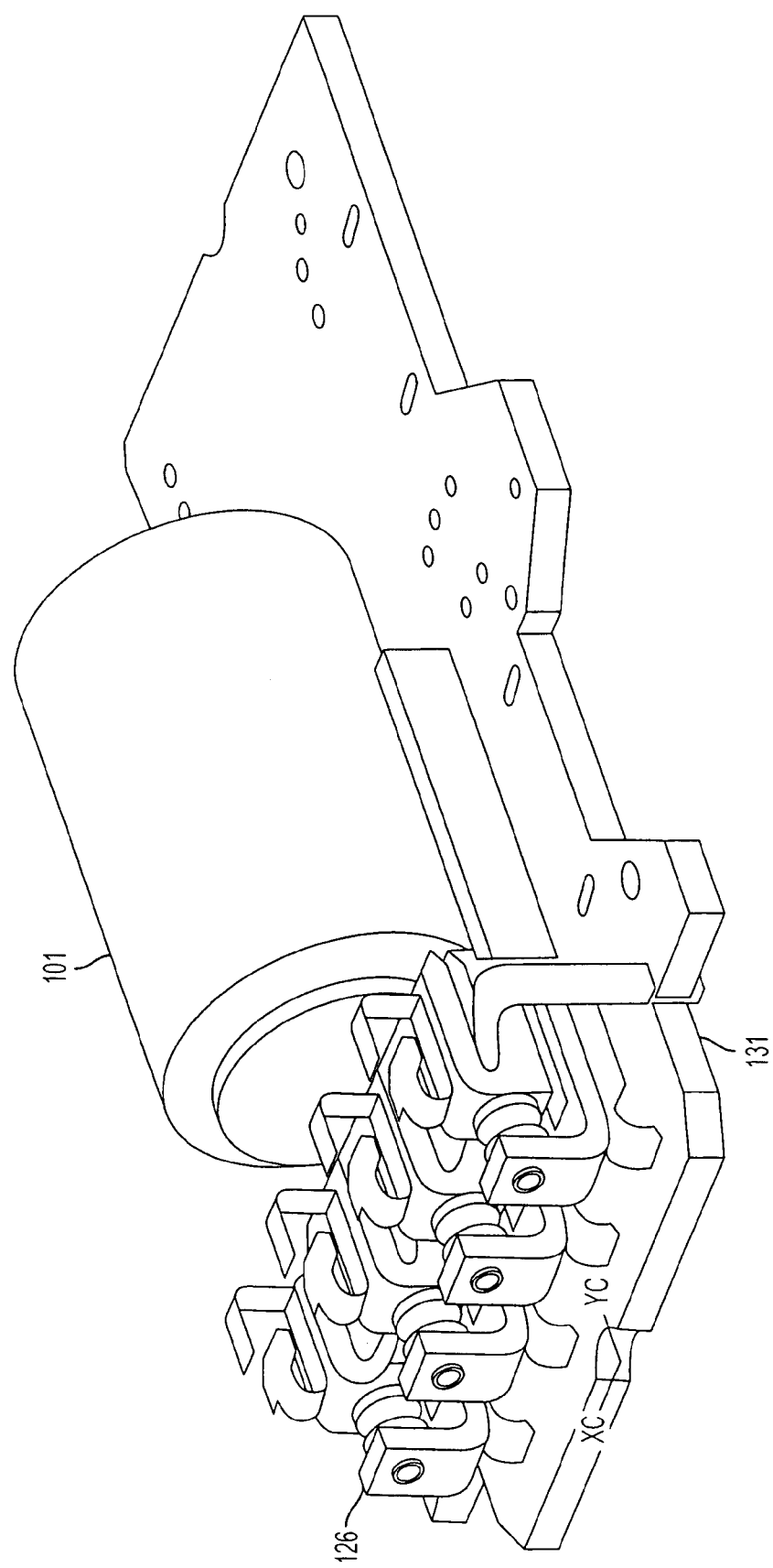
Figure 20:
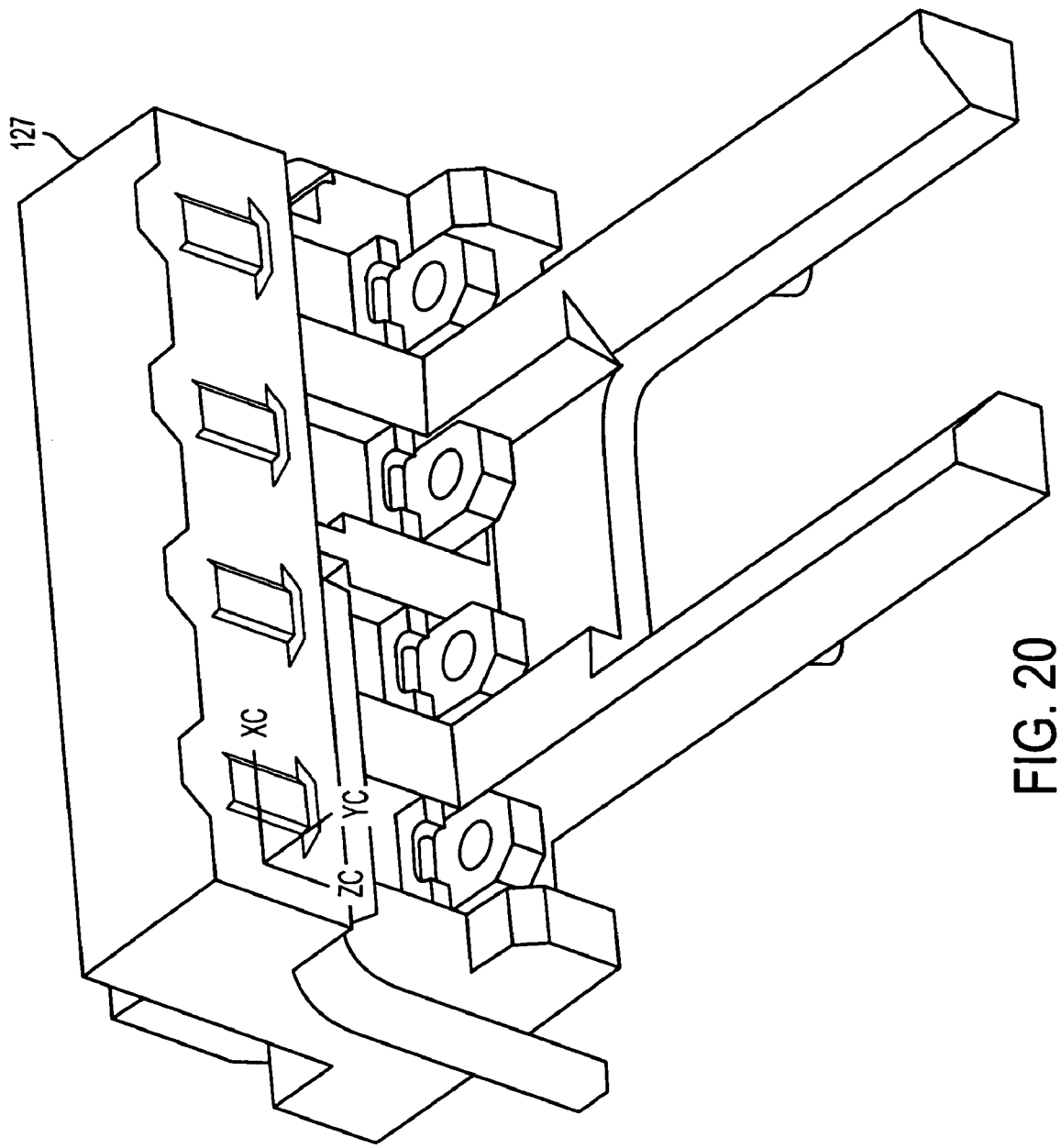
Figure 21:
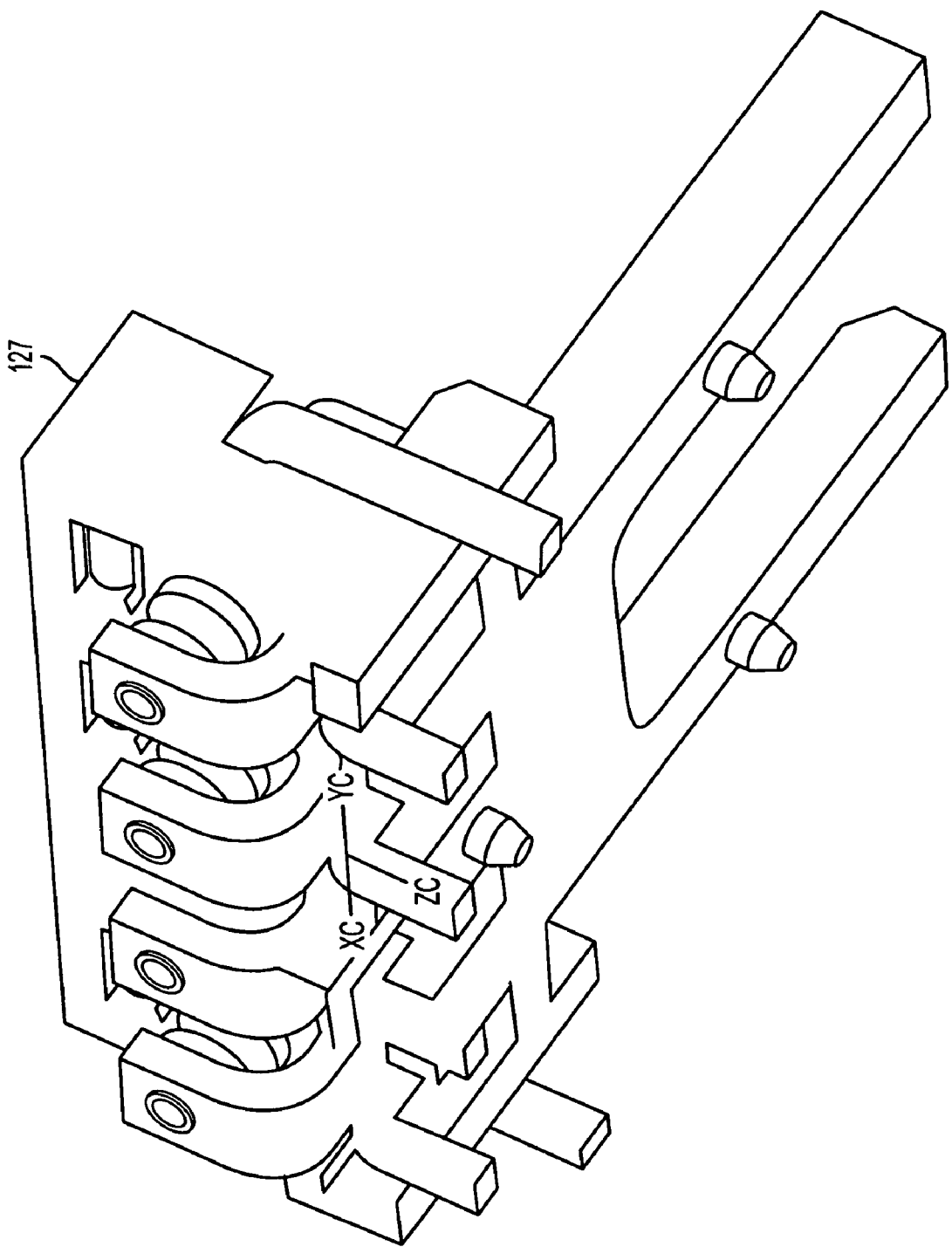
Figure 22:
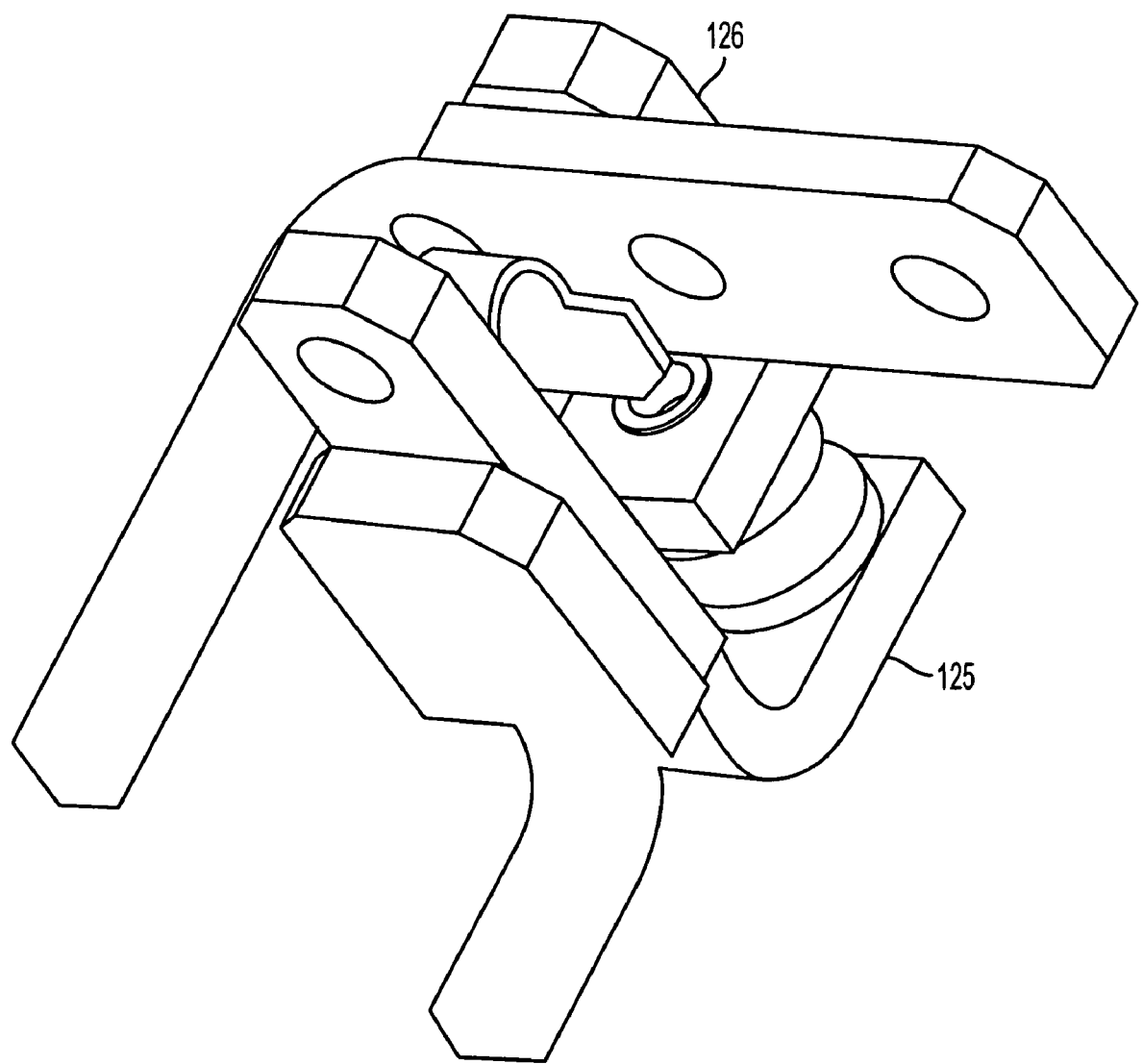
Figure 23:
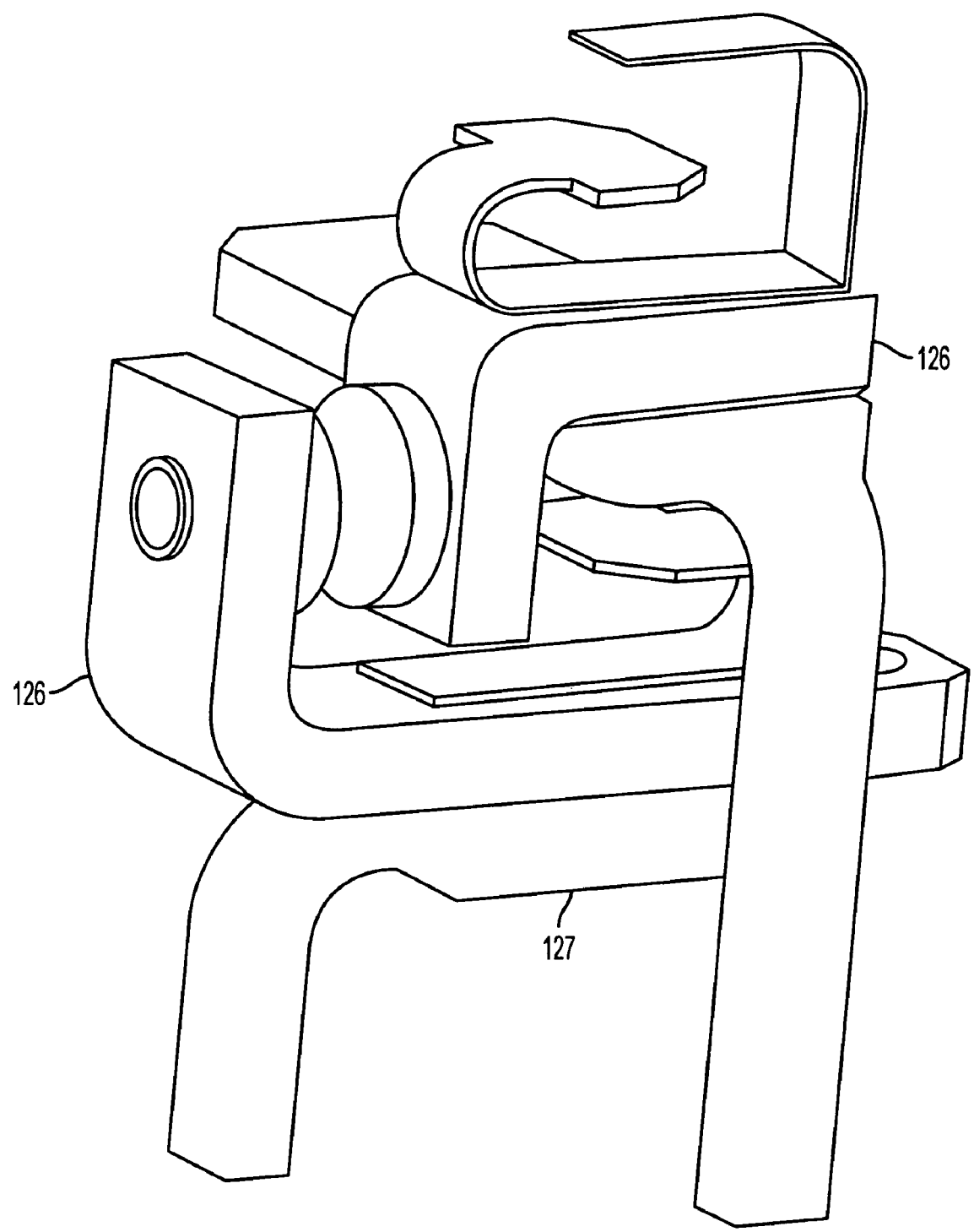

FIG. 1 is a perspective view of an exemplary fault indication and protection circuit 10 in accordance with an embodiment of the present invention. The fault indication and protection circuit 10 can be a ground fault circuit interrupter (GFCI), an arc fault circuit interrupter (AFCI) and/or perform the functions of both an AFCI and GFCI. However, for purposes of illustration, the fault indication and protection circuit 10 will be described as a GFCI device 10. The GFCI device 10 comprises a housing 12 having a cover portion 14 and a rear portion 16. The GFCI device 10 also includes a barrier between the cover portion 14 and the rear portion (e.g., FIGS. 12 and 13) when the cover portion 14 is removed from the rear portion 16. The cover portion 14 and rear portion 16 are removably secured to each other via fastening means such as snaps, barbs, clips, screws, brackets, tabs and the like. The cover portion includes face receptacles (also known as plug/blade slots) 18 and 20 and grounding pin slot 22. It will be appreciated by those skilled in the art that face receptacles 18 and 20 and grounding pin slot 22 can accommodate polarized, non-polarized, grounded or non-grounded blades of a male plug. The male plug can be a two wire or three wire plug without departing from the scope of the present invention. The GFCI device 10 further includes mounting strap 24 having mounting holes 26 for mounting the GFCI receptacle 10 to a junction box (not shown). At the rear wall of the housing 12 is a grounding screw 28 for connecting a ground conductor (not shown).

A test button 30 extends through opening 32 in the cover portion 14 of the housing 12. The test button 30 is used to activate a test operation that tests the operation of the circuit interrupting portion disposed in the GFCI device 10. The circuit interrupting portion, to be described in more detail below, is used to break electrical continuity between the line and load side of the GFCI device 10. A reset button 34 extends through opening 36 in the cover portion 14 of the housing 12. The reset button 34 is used to activate a reset operation, which reestablishes electrical continuity in the open conductive paths.

Rear portion 16 has four screws, only two of which are shown in FIG. 1. Load terminal screw 38 is connected to a neutral conductor and a load terminal screw 37 (See FIG. 2) is connected to the hot conductor. Line terminal screw 40 is connected to the neutral conductor and a line terminal screw 39 (See FIG. 2) is connected to the hot conductor. It will be appreciated by those skilled in the art that the GFCI receptacle 10 can also include apertures proximate to the line and load terminal screws 37, 38, 39 and 40 to receive the bare end of conductors rather than connecting the bare end of the wires to the line and load terminal screws.

GFCI device 10 also has a power/alarm indicator 42 for providing an indication to a user that GFCI device 10 is operating normally, the conductive path between the line and load terminals is open, or the GFCI device 10 is operating as a receptacle without fault protection.

Power/alarm indicator 42 comprises two separate LEDS a green LED 42A and a red LED 42B. In an embodiment of the present invention, the green LED 42A is illuminated when there is power to the GFCI device 10. The red LED 42B is illuminated solid if a ground fault is detected via a manual test or an actual ground fault and the conductive path between the line and load terminals is open. The red LED 42B flashes slow if it is determined during a self-test, a manual test or an actual fault that the contacts do not operate properly. Both the green LED 42A and the red LED 42B are off if the GFCI device 10 is reverse wired, for example, the input power is connected to the load terminals 37 and 38 rather than the line terminals 39 and 40. In another embodiment of the present invention, the power/alarm indicator 42 operates in a manner previously described except when a determination is made that the GFCI device 10 cannot provide ground fault protection, pressing the reset button 34 may allow the contacts to close and the red LED 42B flashes fast. The fast flashing indicates to a user that the GFCI device 10 is operating as a receptacle that does not provide ground fault protection. It should be noted that a flashing red LED 42B indicates that the GFCI device 10 should be replaced. It should be appreciated by those skilled in the art that although the power/alarm indicator is described as having two separate LEDs, a dual chip LED, separate colored lamps, and/or a buzzer can be used among other indicators, to provide an alarm indication without departing from the scope of the present invention.

Figure 2:
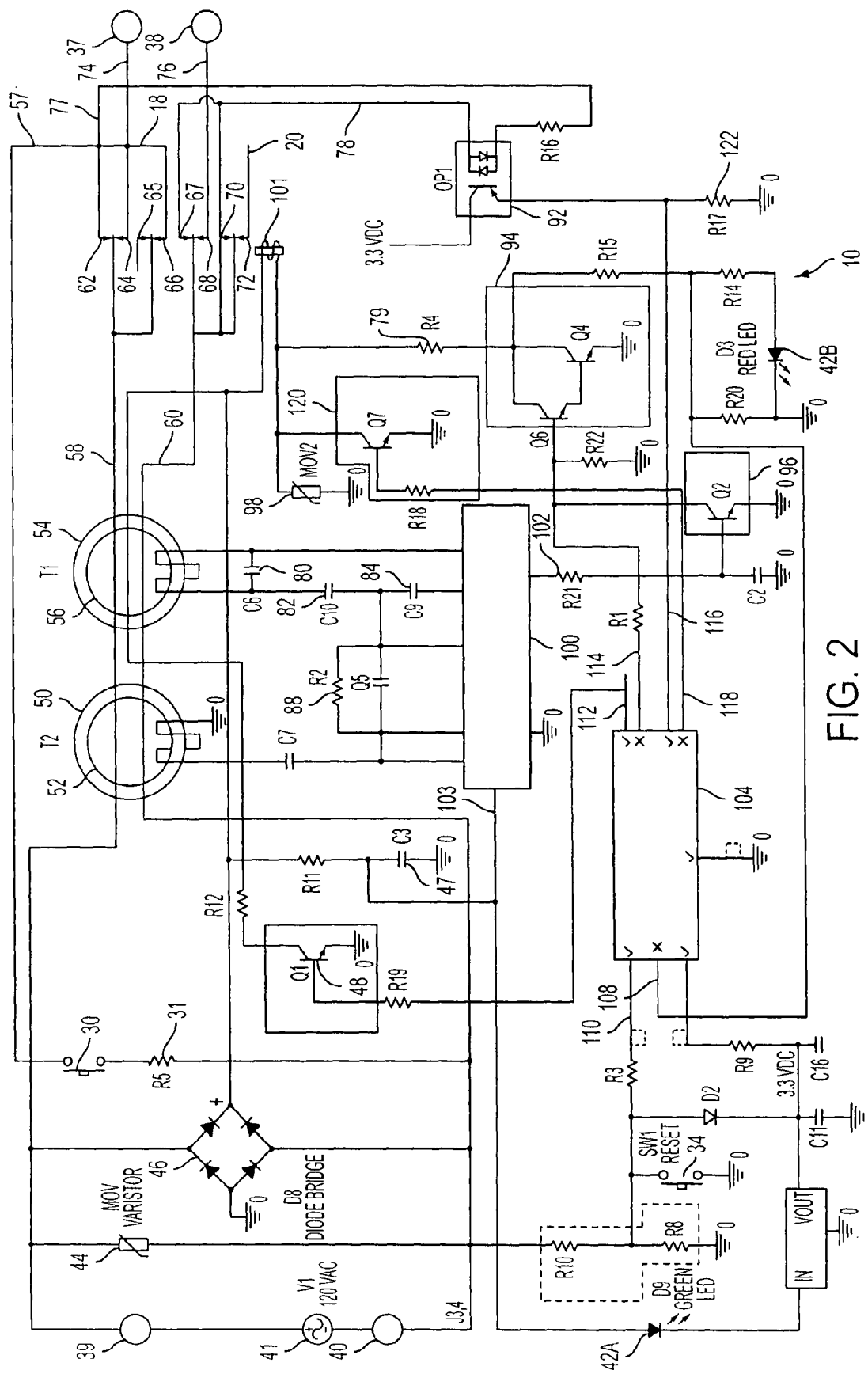
FIG. 2 is a schematic diagram of a ground fault circuit interrupter in accordance with an embodiment of the present invention, in which a conventional GFCI chip is employed in combination with a microprocessor to operate the GFCI.

FIG. 2 is a schematic diagram of a ground fault circuit interrupter in accordance with a first embodiment of the present invention, in which a conventional GFCI chip is employed in combination with a microprocessor to operate the GFCI. Specifically, the GFCI chip is used to open the contacts while the microprocessor is used to maintain the contacts in an open condition. The GFCI device 10 employs a GFCI chip 100 with an output 102 connected to a transistor 96, which is in turn connected to a Darlington transistor 94. A microprocessor 104 is preferably a Type PIC12F629 or PIC12F675 microprocessor manufactured by Microchip, located in Chandler, Ariz. A transistor 120 is powered, via the microprocessor 104, to energize solenoid 101, thus closing contacts 64, 66, 68 and 72 to establish a conductive path between line terminals 39 and 40 and faceplate receptacles 18 and 20 and load or feedthrough terminals 37 and 38.

In an embodiment of the present invention, the PIC12F675 microprocessor 104 is used where there is a need for an I/O port to accept more than one condition. For example, as an option, the test button 30 and reset button 34 can be voltage divided to share an analog I/O port. A voltage divider can be used to distinguish whether the test or reset button was pressed. In another embodiment of the present invention, test button 30 can be eliminated and reset button 34 can be used as a test/reset button. For example, microprocessor 104 would distinguish a first press of the button as being a test and a second press of the button as being a reset. In another embodiment of the present invention, the test button 30 and the reset button 34 can be RC coupled to produce signals having different periods of duration which can be detected by the microprocessor 104.

The GFCI device 10 employs four sets of contacts, namely contacts 62 and 64, 65 and 66, and 67 and 68, and 70 and 72. Contact 64 establishes electrical continuity between line terminal 39 and load terminal 37 via hot conductor 58 and path 74. Contact 68 establishes electrical continuity between line terminal 40 and load terminal 38 via neutral conductor 60 and path 76. Contacts 66 and 72 establish electrical continuity between the line terminals 39 and 40 and face terminals 18 and 20 via hot conductor 58 and neutral conductor 60, respectively. The isolation of contacts 66 and 72 from the load terminals 37 and 38 prevents the face terminals 18 and 20 from being powered if the GFCI device 10 is mistakenly wired so that power source 41 is connected to the load terminals 37 and 38. It should be noted that GFCI device 10 is structured and arranged to permit the electronics of the circuit to only be powered when the GFCI device 10 is wired from the line terminals 39 and 40 via a power source. If a power source 41 is connected to the load terminals 37 and 38, the electronics of the GFCI device 10 cannot be powered to close contacts 64, 66, 68 and 72, which are driven closed by energization of the solenoid 101. Before power is applied, contacts 64, 66, 68, and 72 are open, and contacts 62, 65, 67, and 70 are closed. As discussed in more detail below, when contacts 62 and 67 are closed, opto-isolater 92 detects current from the load hot conductor 58 and neutral conductor 60 via conductors 77 and 78. It should be noted that contacts 64 and 68 are the primary contacts, which close the connection between the line and load terminals. Contacts 62 and 67 are the auxiliary contacts, which provide an indication to opto-isolater 92 that contacts 64 and 68 are open. In operation, when the primary contacts 64 and 68 are closed, the auxiliary contacts 62 and 67 are open and vice versa. This function can be performed by a single pole double throw switch, for example.

The contacts 64, 66, 68 and 72 are opened and closed simultaneously by a solenoid 101 preferably having specifications as detailed in TABLE 1 below. A suitable solenoid 101 for example, has a footprint of about 0.650 square inch, an aspect ratio of about 1.500, and dimensions of about 0.650 inch in height, 0.650 inch in width, and 1.00 inch in length. It should be appreciated by those skilled in the art that the subject invention is not limited to the types of solenoids mentioned, and that alternate types of solenoids can be substituted without departing from the scope of the present invention.

TABLE 1

EXAMPLE OF RELAY SPECIFICATIONS

| | |
|---|---|
| Total time for Contacts to open and re-close | 20 msec. |
| Holding Force in Fully Pulled-In Position (d = 0-.010) | 1.75 lbs. Minimum |
| Initial Pull Force when First Energized (d = .050-.060) | 0.15 lbs. Minimum |
| Stroke | >.060" |
| Ambient Temperature | −35 C. to 66 C. ° |
| Required PC Board Area | 1.00" by 0.65" max. |
| Coil Hot Spot Temperature | Less than 95° C. at 25° C. ambient |
| Coil Operation | Normal operation is continuously on; powered by a full wave rectified 120 VAC signal (+10%-15%) |

The detection of a ground fault condition at a load connected to one of the face receptacles 18, 20 or to the load terminals 37 and 38, is implemented by a current sense transformer 54, and the GFCI chip 100 as well as other interconnecting components. The GFCI chip 100 is preferably a Type RV4145N integrated circuit. The GFCI chip 100 and the microprocessor 104 are powered from the line terminals 39 and 40 by a full-wave bridge rectifier 46 and filter capacitor 47. A transient voltage suppressor 44 is connected across the line terminals 39 and 40 to provide protection from voltage surges due to lightning and other transient conditions. As the transients increase, the voltage suppressor 44 absorbs energy.

Within the GFCI device 10, the hot conductor 58, as mentioned above, connects the line terminal 39 to the load line terminal 37, and neutral conductor 60 connects the line terminal 40 to the load terminal 38, in a conventional manner. The conductors 58 and 60 pass through the magnetic cores 52 and 56 of the two transformers 50 and 54, respectively. The transformer 54 serves as a differential sense transformer for detecting a leakage path between the line side of the AC load and an earth ground (not shown), while the transformer 50 serves as a grounded neutral transformer for detecting a leakage path between the neutral side of the AC load and an earth ground. In the absence of a ground fault, the current flowing through the conductors 58 and 60 are essentially equal and opposite, and no net flux is generated in the core 56 of the differential sense transformer 54. In the event that a connection occurs between the line side of the AC load and ground, however, the current flowing through the conductors 58 and 60 no longer cancels, and a net flux is generated in the core 56 of the differential sense transformer 54. This flux gives rise to a potential at the output of the secondary coil 56, and this output is applied to the input of the GFCI chip 100 to produce a trip signal on the output line 102. The trip signal, which is a pulse of about 6 milliseconds, is provided to transistor 96 via pin 102 of the GFCI chip. The trip signal activates transistor 96 which causes the collector of transistor 94B to rise. This inhibits the transistor 94 and removes power to the solenoid 101, which opens the contacts 64, 66, 68 and 72. The GFCI trip signal is reinforced by the microprocessor 104. Specifically, pin 114 of the microprocessor 104 goes low to maintain Darlington transistor 94 in an off state. That is, the GFCI trip signal opens contacts 64, 66, 68 and 72 and the microprocessor 104 maintains the 64, 66, 68 and 72 in an open state. It should be noted that when the contacts 64, 66, 68 and 72 are open, the contacts 62, 65, 67 and 70 are closed. The opening of contacts 64, 66, 68 and 72 removes AC power from the face receptacles 18 and 20 and the load or feedthrough terminals 37 and 38.

Since the GFCI chip 100 is a commercially available component, its operation is well known to those skilled in the art, and need not be described in detail. In utilizing the GFCI chip 100, resistor 88 serves as a feedback resistor for setting the gain of the controller and hence its sensitivity to normal faults. Capacitors 80 and 84 provide noise filtering at the inputs of the controller. Capacitor 82 AC couples low frequency signals out of the sense transformer 54 to the GFCI chip's 100 internal operational amplifier (not shown).

The contacts 64, 66, 68 and 72 are in a closed state while contacts 62, 65, 67 and 70 are in an open state when the solenoid 101 is energized. This state will be referred to as the normal state or closed state. However, when the solenoid 101 is not energized, the contacts 64, 66, 68, and 72 are in an open state, while contacts 62, 65, 67 and 70 are in a closed state. This state will be referred to as an abnormal or open state.

The solenoid 101 is energized when the GFCI device 10 is wired from the line terminals 39 and 40. The bridge 46 provides power to the solenoid 101. Specifically, the solenoid 101 is energized in two steps. First, the microprocessor 104 provides a high signal on pin 118 which activates transistor 120 for about 10 ms or longer. This energizes the solenoid 101 and closes contacts 64, 66, 68 and 72. The microprocessor 104 then provides a high signal on pin 114 which activates Darlington transistor 94. Transistor 120 is deactivated, and the Darlington transistor 94 stays on to maintain the drive on solenoid 101 via resistor 79. The solenoid 101 is energized via two steps to maintain the heat generated thereby at a low level.

In operation, a ground fault can occur via a manual test, a self-test, or an actual ground fault, such as when a person comes into contact with the line side of the AC load and an earth ground at the same time. In a manual test described in more detail below, a user presses test button 30. Test button 30 is connected between the hot conductor 58 and neutral conductor 60. When the test button 30 is pressed, an imbalance is detected by sense transformer 54. Specifically, the current passes through resistor 31, the core 52 of the ground transformer, the core 56 of the sense transformer 54 via the hot conductor 58. However, for the return path bypass conductor 57 is used rather than the neutral conductor 60. Since there is no canceling current in the opposite direction, sense transformer 54 detects the current imbalance. As discussed above, the GFCI chip 100 detects a fault condition via transformers 50 and 54. GFCI chip 100 communicates the fault condition via a trip signal on pin 102 to transistor 96, which becomes activated. The activation of transistor 96 inhibits Darlington transistor 94 which results in the solenoid 101 shutting off, contacts 64, 66, 68 and 72 opening and contacts 62, 65, 67 and 70 closing. The trip signal is reinforced by the microprocessor 104 which makes pin 114 of the microprocessor 104 to go low and maintain the solenoid 101 in the deenergized state, which also maintains contacts 64, 66, 68 and 72 in an open state. The microprocessor 104 does not determine whether a ground fault was triggered by an actual fault or by a manual fault simulated by pressing test button 30, and therefore operates as if an actual fault condition has occurred in either situation.

The microprocessor 104 also does not detect whether the actual fault has been removed until a user presses the reset button 34. When the reset button 34 is pressed, an input is provided to pin 110 and the microprocessor 104 closes the contacts 62, 65, 67 and 70. If the fault is still present, the transformers 50 and 54 will detect the condition and GFCI chip 100 will reopen the contacts 62, 65, 67 and 70 immediately as discussed above. If a manual test was performed, the fault will no longer be present and microprocessor 104 will close the contacts 62, 65, 67 and 70 and check for the existence of faults. If there are no faults, the GFCI device 10 returns to normal operation.

In an embodiment of the present invention, a self-test is performed on the fault detection portion of the GFCI device 10. In this example, the self-test is preferably performed at 1 minute intervals, but the microprocessor 104 can be programmed to perform testing at any interval of time. During the self-test, the microprocessor 104 communicates a signal to the transistor 48 via pin 112, which creates an imbalance similar to that caused by closing test button 30 that is detected by the transformers 50 and 54. The GFCI chip 100 communicates the imbalance to transistor 96 via a trip signal on pin 102, which activates transistor 96. The activation of transistor 96 causes the collector of transistor 94B to rise. When the collector of transistor 94B rises, a signal is placed on pin 108 of the microprocessor 104, which looks for an external interrupt. When the signal is detected on pin 108, the microprocessor 104 immediately disables the signal on transistor 48 via pin 112. The one minute test occurs very quickly (e.g., in hundreds of microseconds). Once the one minute test is complete, the microprocessor 104 puts pin 114 high and pin 112 low. Since the microprocessor 104 is programmed to initiate the fault condition, it waits to receive the signal from the GFCI chip 100 via pin 108. Therefore, the microprocessor 104 does not control the solenoid to open the contacts 64, 66, 68 and 72. If the microprocessor 104 does not receive the expected signal from the GFCI chip 100 within a predetermined period of time, it determines that the fault detection portion of GFCI 10 is defective and activates the red LED 42B in a manner which will be described below. It should be noted that under normal conditions, the once per minute test is not conducted if contacts 64, 66, 68 and 72 are open. It should also be noted that if an actual ground fault occurs during the once per minute test, the GFCI device 10 responds to the actual ground fault.

In another embodiment of the present invention, a self-test is performed on the circuit interruption portion of the GFCI device 10. This self-test is preferably performed at daily intervals, but the microprocessor 104 can be controlled to perform this test at any desired interval. During testing, the microprocessor 104 communicates a signal to the transistor 48, which creates an imbalance in the transformers 50 and 54. The GFCI chip 100 communicates the imbalance to transistor 96 using a trip signal via pin 102, which activates transistor 96. The activation of transistor 96 causes the collector of transistor 94B to rise. When the collector of transistor 94B rises, it causes the solenoid 101 to be deenergized which opens the contacts 64, 66, 68 and 72. The auxiliary contacts 62 and 67 close. Now, diode current is in the opto-isolator 92. The opto-isolator 92 puts out a signal across resistor 122 into pin 116 of the microprocessor 104. The opto-isolator 92 signals the microprocessor 104 that the contacts 64, 68, 66 and 72 are open, and that contacts 62 and 67 are closed. The microprocessor 104 maintains open the contacts 64, 68, 66 and 72 momentarily long enough to validate the signal (preferably for a period of time not to exceed 20 msec.) and, in order to avoid disrupting the load during the daily self-test. The microprocessor 104 then recloses contacts 64, 68, 66 and 72 and opens auxiliary contacts 62 and 67 via a high signal on pin 114.

In an embodiment of the present invention, if the GFCI device 10 determines that the one minute periodic test failed, the one minute test can be repeated (e.g. three times) and if the test fails two out of the three times, the GFCI device 10 can be declared as non-operational. As previously described, the red LED 42B will flash slow or fast depending on the mode it is in. In one embodiment of the present invention, the GFCI device 10 is prevented from allowing a user to reset if the GFCI device is determined to be non-operational. Thus, there is not a continuous path between line terminals 39 and 40 and load terminals 37 and 38, and the GFCI device 10 fails to operate. The red LED 42B will then flash slowly. In another embodiment of the present invention, the GFCI device 10 allows a user to reset the GFCI device 10, if the GFCI device 10 is determined to be non-operational. The red LED 42B will then flash fast to indicate that the GFCI device 10 is not providing ground fault protection. In another embodiment of the present invention, in order to detect the inoperability of the GFCI device 10, after the manual test button 30 is pushed and prior to the reset button 34 being pressed, a determination can be made as to whether the contacts 64, 66, 68 and 72 remain closed for a specific duration of time before classifying the GFCI device 10 as being inoperable. In still another embodiment of the present invention, in order to detect the inoperability of the GFCI device 10, a once per day test can be performed after the reset button 34 is pressed to determine the operability of the GFCI device 10 because device self-test failed.

In another embodiment of the present invention, when the microprocessor 10 detects the nonfunctioning of GFCI device 10 during either the periodic minute or daily test, the GFCI 10 can be optioned to provide a lockout feature wherein a user cannot reset the contacts of GFCI device 10. However, the lockout feature will not take effect if a manual test was performed.

The automatic daily self-test, mentioned above, is performed on a periodic basis. The microprocessor 104 can maintain a software record of the current state of the contacts 64, 68, 66 and 72 (i.e., either open or closed) and conducts an automatic self-test only if normal operation is in progress with the contacts 64, 68, 66 and 72 being closed.

In an embodiment of the present invention, the microprocessor 104 monitors the AC sinusoidal signal and performs the self-test only when the sinusoidal signal is not at a zero-crossing point. For example, pin 112 is driven high near the peak of the sinusoid. Pin 112 activates transistor 48 only long enough for the collector of transistor 94B to go high for 200 microseconds. Pin 108 detects that the collector of transistor 94B was high for 200 microseconds.

It should be noted that if the GFCI device 10 is determined to be nonfunctional, and operates in a receptacle mode of operation, the self-tests are prevented from occurring. The microprocessor 104 maintains pin 114 high which maintains transistor 94B in an on state and the contacts closed. The microprocessor 104 flashes the red LED 42B via pin 108.

In another embodiment of the present invention, the microprocessor 104 does not monitor the zero-crossing of the sinusoidal signal. Rather, the microprocessor 104 performs two self-tests within 4.2 ms apart. This prevents the self-test from accepting a false positive caused by the test occurring at a zero-crossing point being initiated at a zero-crossing point.

In still another embodiment of the present invention, the GFCI device 10 can be optioned by a user to convert from a unit that performs both a daily and one minute periodic test to a unit that only performs a periodic one minute test and vice versa.

The present invention will now be described with reference to green LED power/alarm indicator 42A and red LED power/alarm indicator 42B both of which constitute power/alarm indicator 42. During normal operation of the GFCI device 10, the solenoid 101 is energized via pins 114 and 118 of the microprocessor 104. The green LED 42A is powered via pin 103 of the GFCI chip 100. Pin 103 provides 26 volts to the green LED 42A. The red LED 42B is off and the green LED 42A is on.

It should be noted that the GFCI chip 100 includes a regulator that provides a dual function. One function is to power the internal circuitry of the GFCI chip 100. The second function is to power circuitry external to the GFCI chip 100 (e.g. microcontroller 104).

During a fault condition, contacts 64, 66, 68 and 72 are open and the collector of transistor 94B is high, the current from the solenoid 101 powers the red LED 42B via resistor 122. If the GFCI device 10 is determined to be inoperable and the contacts 64, 66, 68 and 72 are open, pin 108 of the microprocessor 104 is used as an output and is driven low which turns the red LED 42B off. The signal on pin 104 can alternate between high and low and can therefore be used to flash the red LED 42B.

In an embodiment of the present invention, varistor 98 is used across the transistor 120 to protect the transistor from transient voltages that occur when the solenoid 101 is energized or deenergized.

Figure 3:
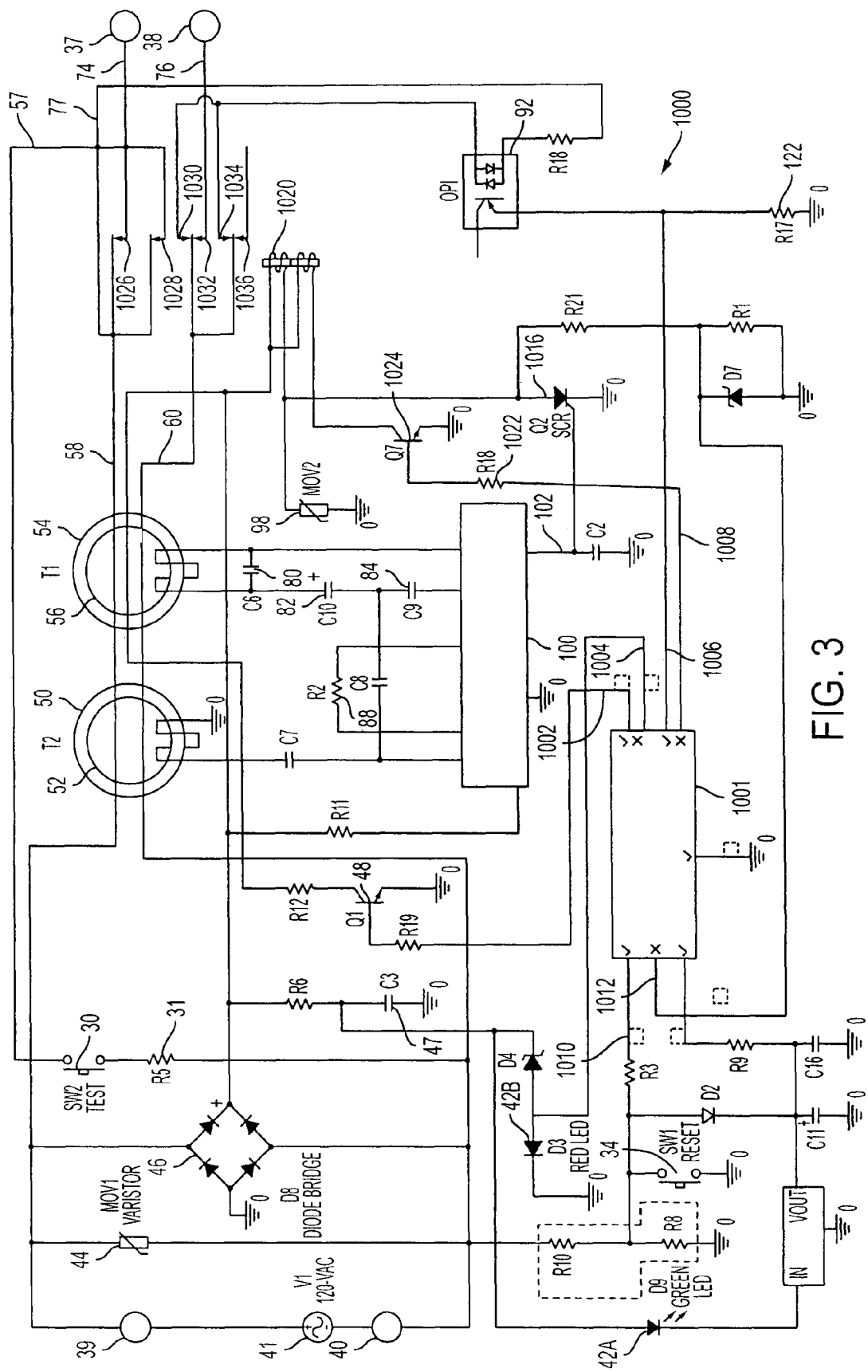
FIG. 3 is a schematic diagram of a ground fault circuit interrupter in accordance with another embodiment of the present invention, in which a conventional GFCI chip is employed in combination with a microprocessor and a bistable solenoid to operate the GFCI device.

FIG. 3 is a schematic diagram of a ground fault circuit interrupter in accordance with another embodiment of the present invention, in which a conventional GFCI chip 100 is employed in combination with a microprocessor 1001 and a bistable solenoid 1020 having an open contact coil and a closed contact coil to operate the GFCI device 1000. When the GFCI device 1000 is initially powered or power is restored after a power outage, main contacts 1026 and 1032, and face contacts 1028 and 1036 are open. Auxiliary contacts 1030 and 1034 are structured and arranged to be open when main contacts 1026 and 1032, and face contacts 1028 and 1036 are closed and to be closed when main contacts 1026 and 1032, and face contacts 1028 and 1036 are open. During a start-up sequence initiated by the microprocessor 1001, a start-up self-test is performed within the approximately 90 msec of the start-up sequence. Contacts are closed via pin 1008 (i.e., pin 1008 provides a high signal momentarily to close the contacts coil). This is detected via pin 1006, i.e., opto signal stops. Output pin 1002 high places the main contacts 1026 and 1032 in an open state. The microprocessor 1001 detects that input pin 1012 is high which indicates that SCR 1016 is off. Main contacts 1026 and 1032 are maintained in an open state. The microprocessor 1001 further detects that input pin 1006 is high which indicates that opto-isolator 92 has detected that the main contacts 1026 and 1032 are open and auxilliary contacts 1030 and 1034 are closed. The microprocessor 1001 momentarily places output pin 1008 high which activates transistor 1024 and in turn energizes the close contact coil of the solenoid 1020 closing the main contacts 1026 and 1032.

If an actual ground fault is detected by the GFCI device 1000, sense transformer 54 provides an imbalance signal to the GFCI chip 100. The GFCI chip 100 provides a trigger signal to SCR 1016, which in turn energizes the open contact coil of the solenoid 1020. The SCR 1016 is deactivated at the end of the next zero-crossing. after the contacts open in response to the ground fault signal.

A user can reset the GFCI device 1000 via the reset button 34. The microprocessor 1001 detects the activation of the reset button 34 via input pin 1010, and momentarily pulses output pin 1008 high to activate transistor 1024 and energize the close contacts coil of solenoid 1020. The close contacts coil of solenoid 1020 will stay closed if the ground fault no longer exists.

It should be noted that the GFCI chip 100 operates on full wave rectified AC to enable the main contacts 1026 and 1032 to open immediately in the presence of a ground fault.

During a once per minute test, output pin 1002 is pulsed high substantially near the end of an AC sinusoid when insufficient energy remains in the half sinusoid to open the contacts via the open contact coil of solenoid 1020. Output pin 1002 is placed low near the end of the half sinusoid preventing SCR 1016 from activating for the subsequent half sinusoid. The microprocessor 1001 detects about a 1 msec drop out in the signal via input pin 1012.

During a once per day test, the microprocessor 1001 momentarily pulses pin 1002 high substantially near the peak of the AC sinusoid. Transistor 48 is activated and causes a current imbalance which is detected by sense transformer 54. Sense transformer 54 provides the imbalance indication to GFCI chip 100. GFCI chip 100 provides a trigger signal to SCR 1016 via pin 102. SCR 1016 then momentarily energizes the open contact coil of the solenoid 1020.

The microprocessor 1001 detects that the main contacts 1026 and 1032 are open and auxiliary contacts 1030 and 1034 are closed via the opto-isolator 92 and input pin 1006. The microprocessor 1001 then pulses output pin 1008 high which activates transistor 1024 to energize the close contacts coil of solenoid 1020.

It should be noted that neither the open contacts coil of the solenoid 1020 nor the close contacts coil of the solenoid 1020 is continuously energized at any time. If the GFCI device 1000 is improperly wired from the load side, the solenoid 1020 cannot be energized.

In this embodiment of the present invention, GFCI chip 100 opens the contacts, and microprocessor 1001 closes the contacts.

When the GFCI device 1000 is wired on the line side, the red LED 42A is illuminated. When the main contacts 1026 and 1032 are open or the GFCI device operates in a receptacle mode, the green LED 42B flashes.

In another embodiment of the present invention, the solenoid 1020 can include a single coil, a permanent magnet and a spring. When the coil is momentarily energized with a positive polarity, the electromagnetic force overcomes the spring force and pulls the plunger inward toward the solenoid 1020 and the permanent magnet. The permanent magnet retains the plunger in this inward position when the coil is deenergized. When the coil is momentarily energized with a negative polarity, the electromagnetic field is approximately equal to but opposite in polarity to the field of the permanent magnet. The permanent magnet field is canceled and the spring force pulls the plunger away from the magnet and retains it in that position when the coil is deenergized. It should be appreciated by those skilled in the art that the orientation of the polarity of the coil and the position of the plunger can be reversed without departing from the scope of the present invention.

Figure 4:
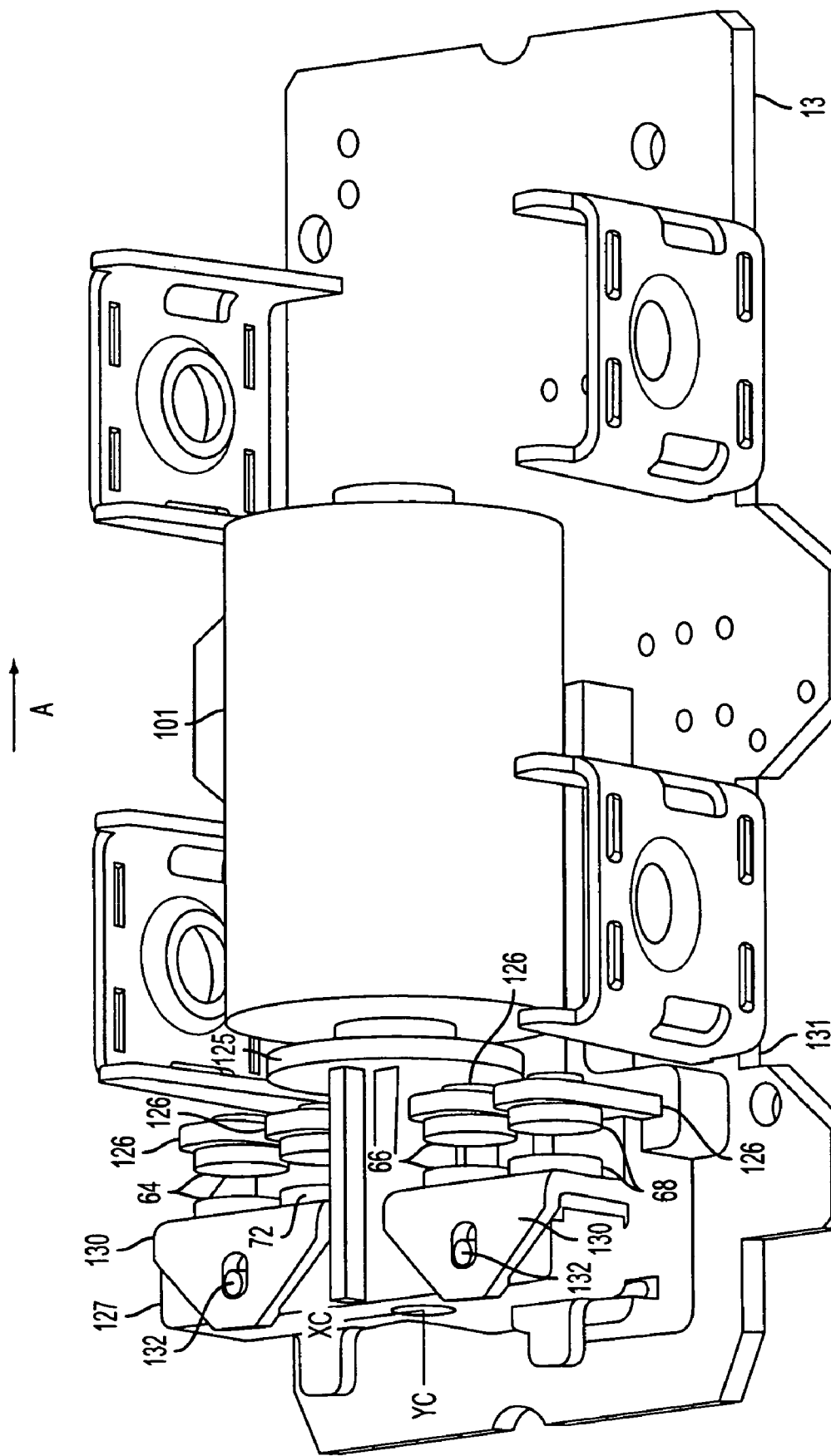
FIGS. 4 through 23 are perspective views illustrating components of the ground fault circuit interrupter disposed on the inner housing of the GFCI in accordance with an embodiment of the present invention.
Figure 5:
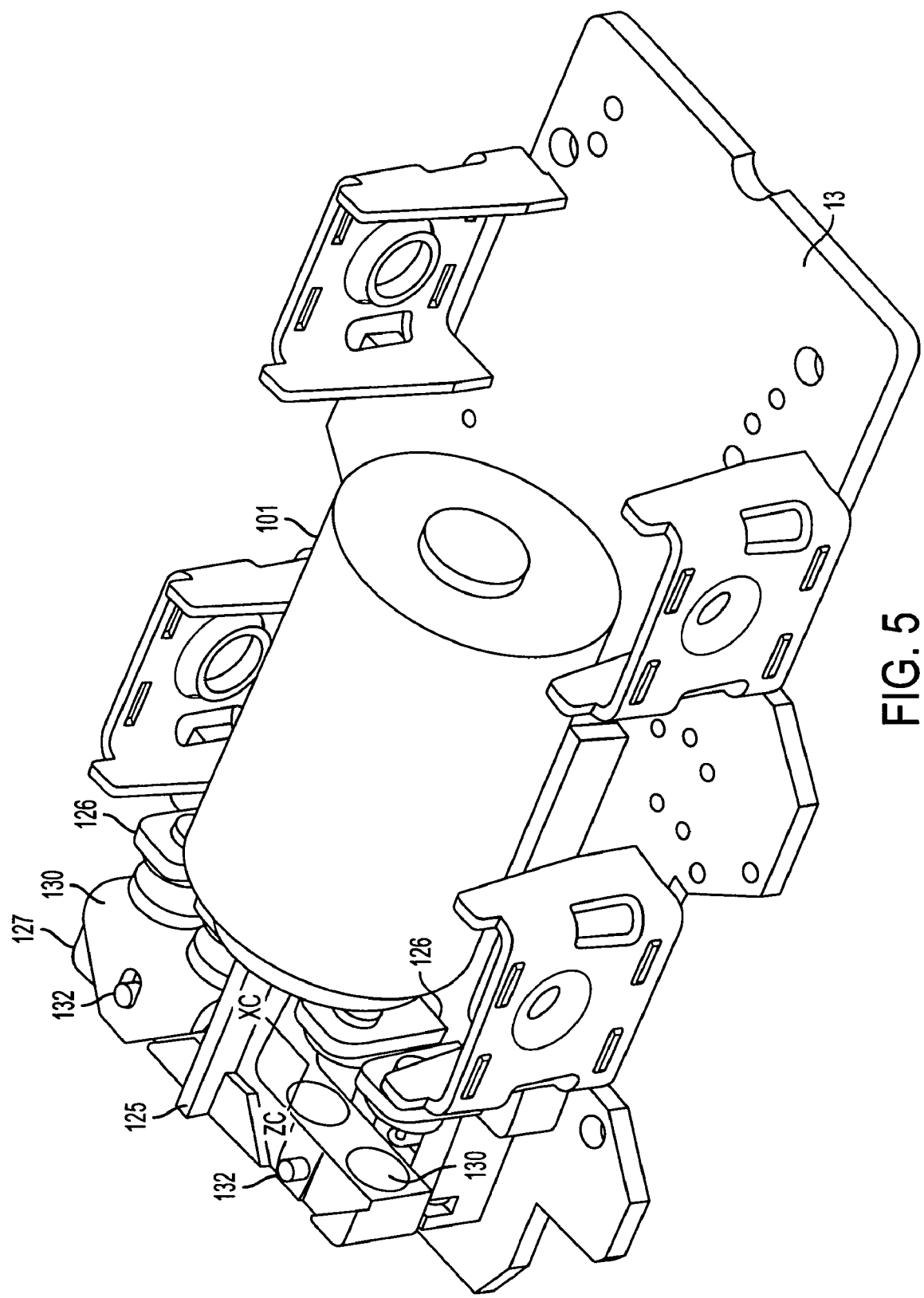
Figure 6:
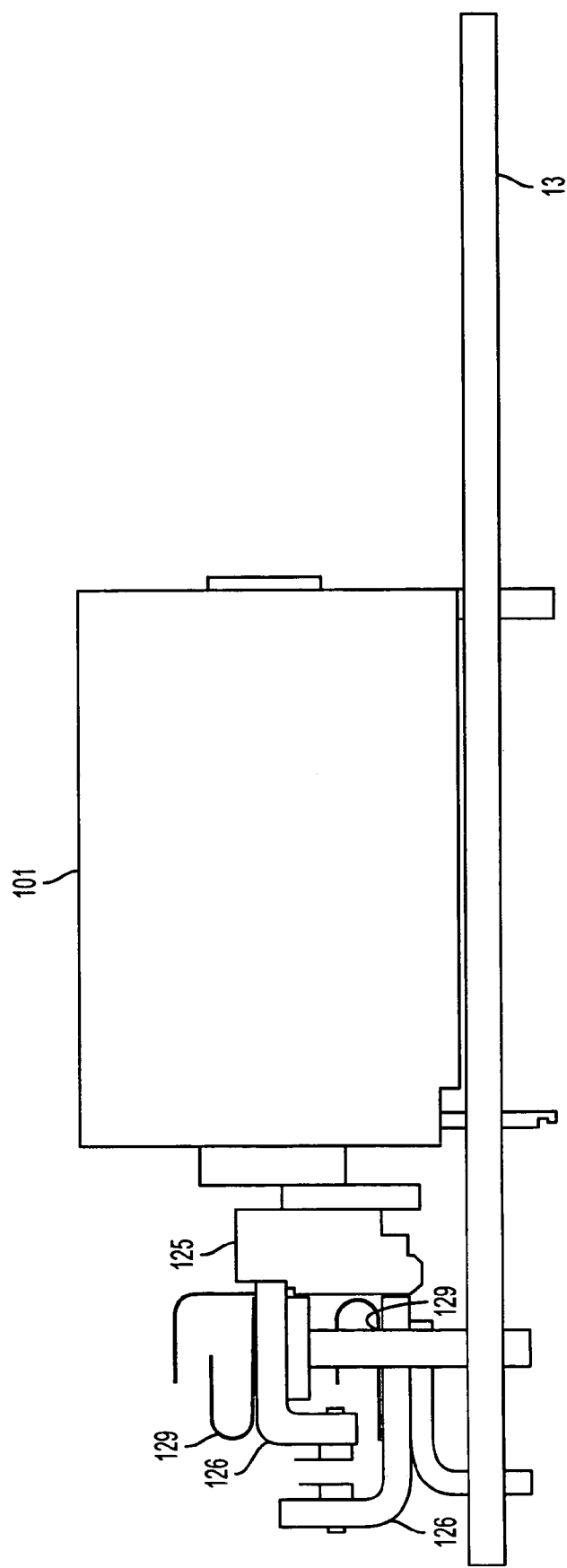
Figure 7:
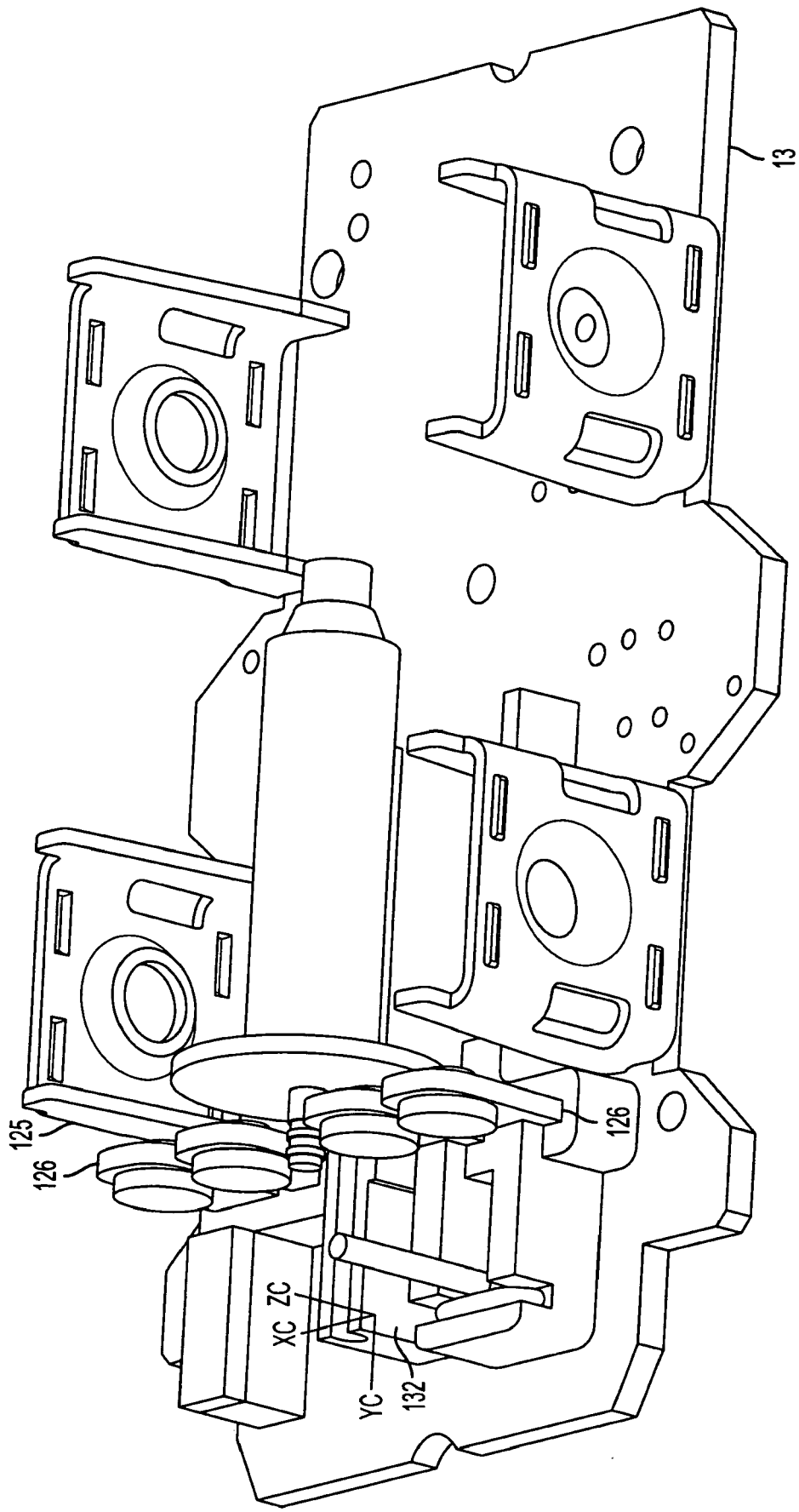
Figure 8:
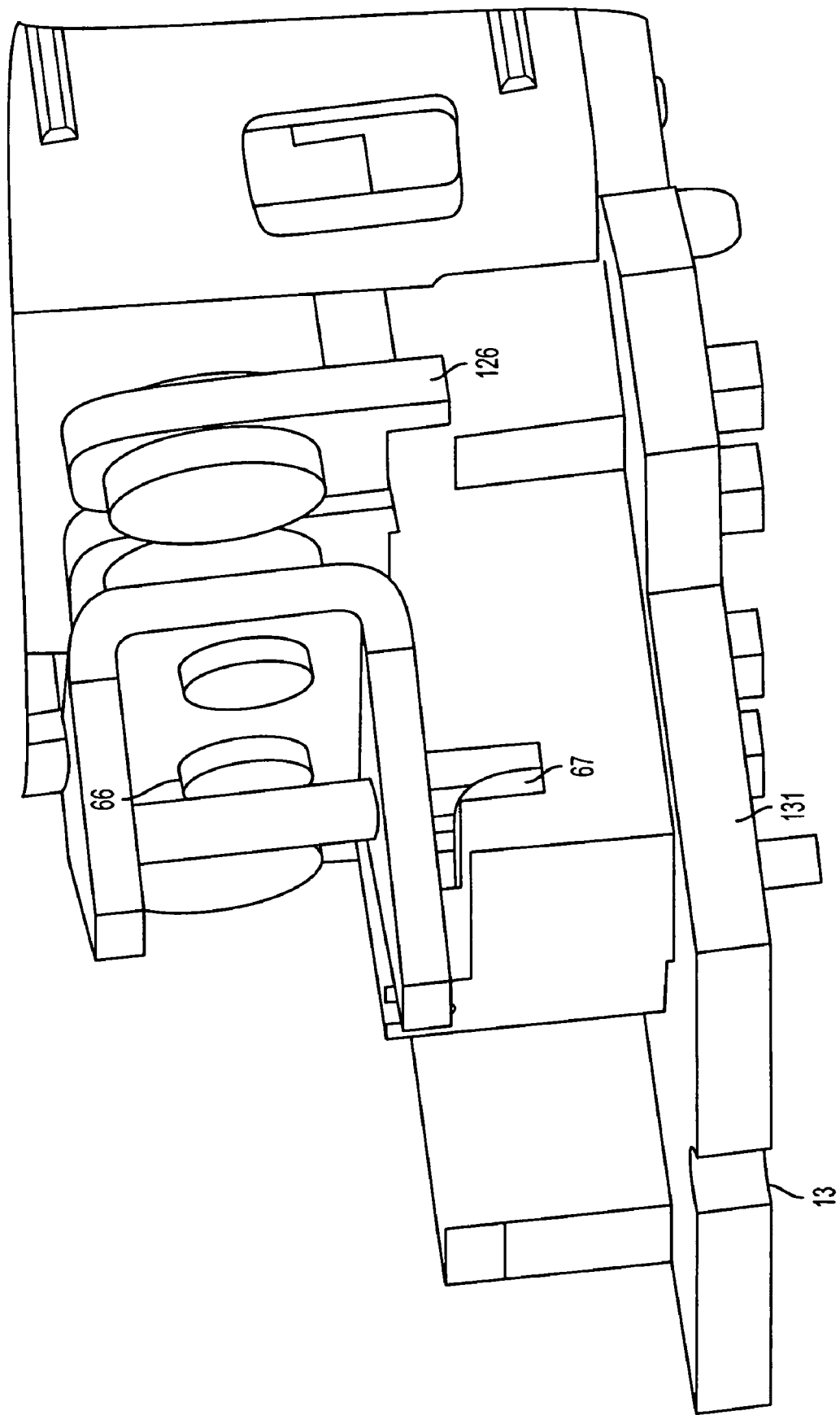
Figure 9:
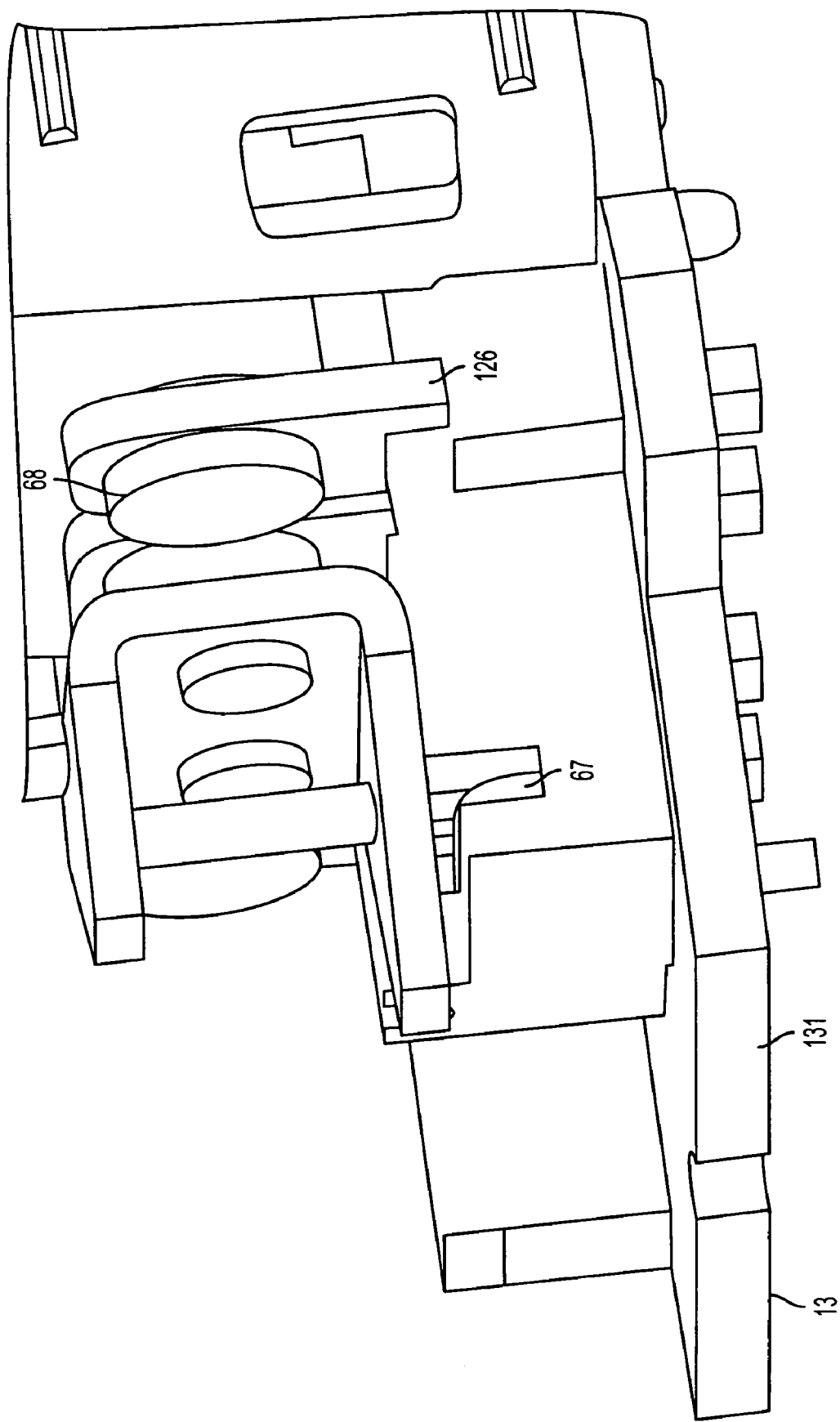
Figure 10:
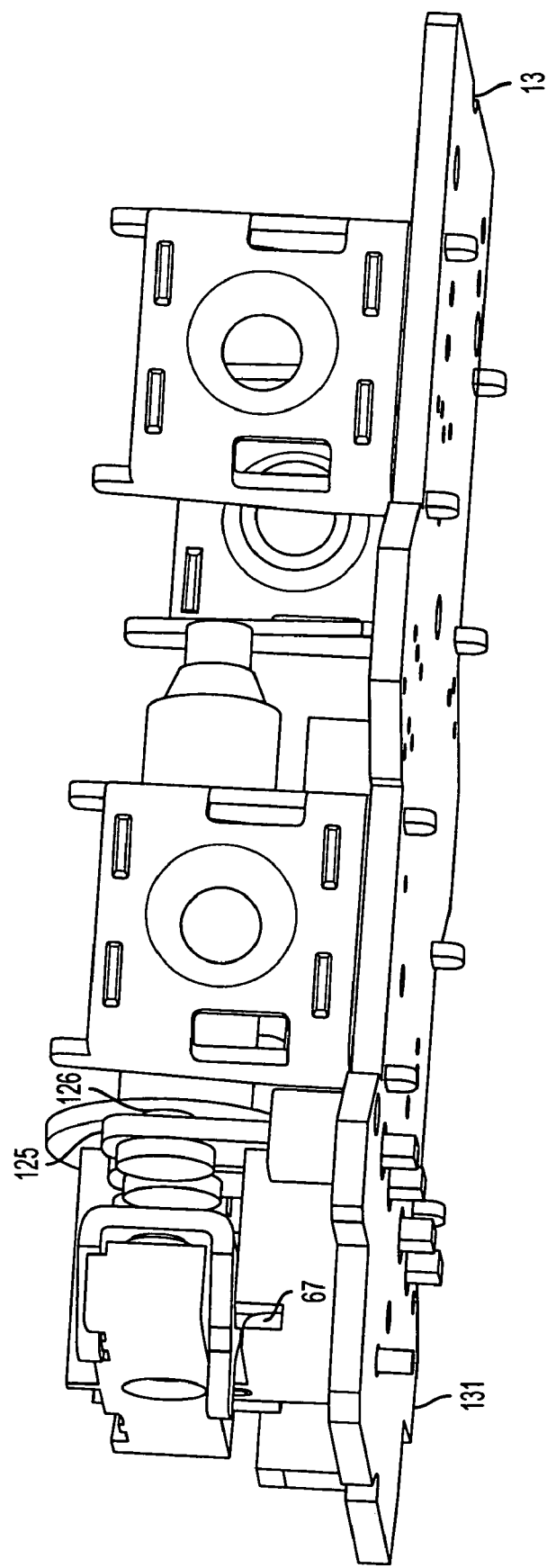
Figure 11:
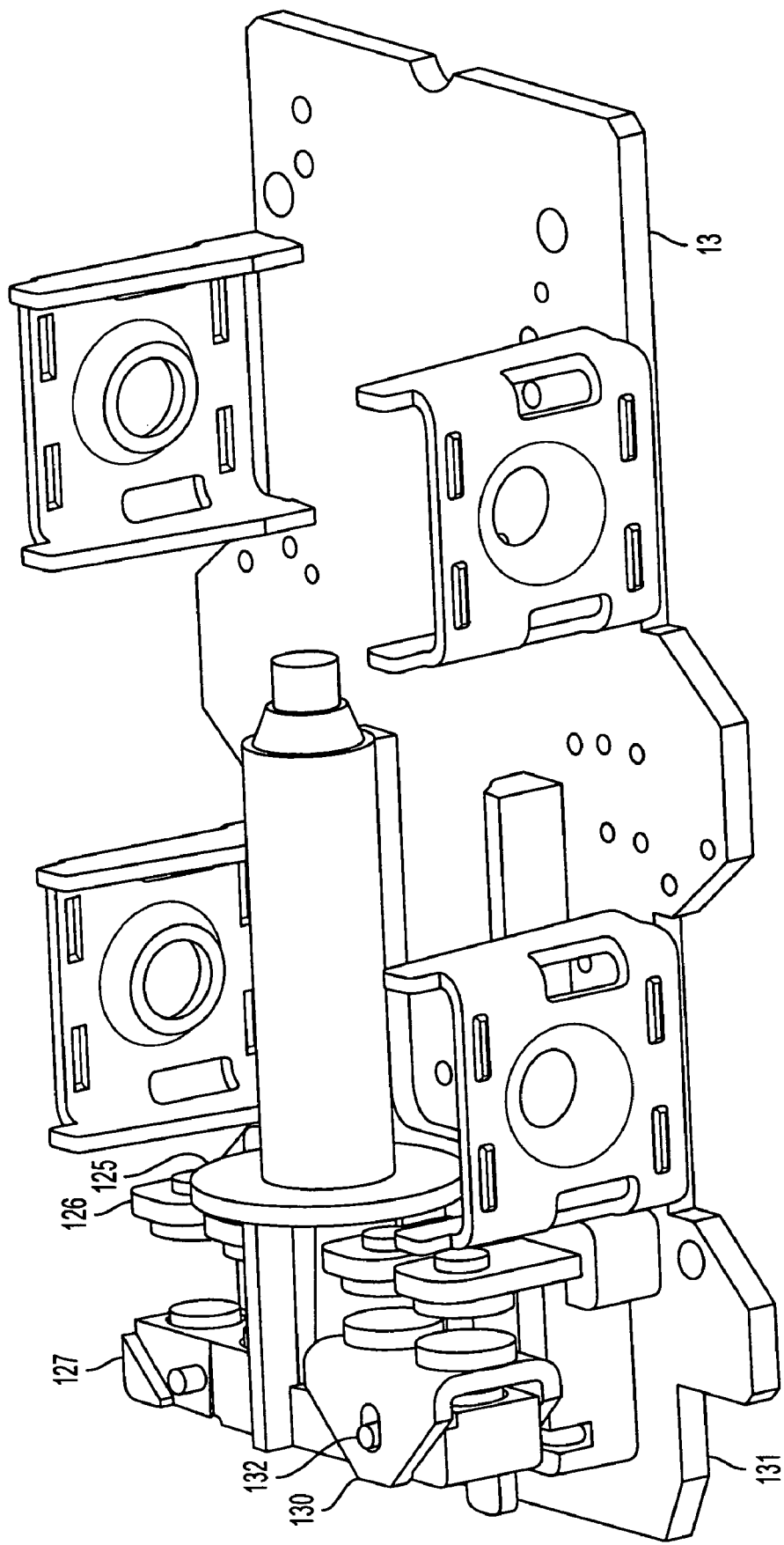

FIGS. 4 through 23 are perspective views illustrating components of the ground fault circuit interrupter disposed on the inner housing of the GFCI in accordance with an embodiment of the present invention. The GFCI device 10 of FIG. 4 comprises solenoid 101, solenoid plunger 125, brushes 130, brush holder 127, terminals 126, pins 132, frame 131, contacts 64, 66, 68 and 72. The frame 131 and brush holder 127 are comprised of a heat resistant material. It should be appreciated by those skilled in the art that a variety of non-metallic materials may be used without departing from the scope of the present invention. Non-metallic materials provide the housing with structural integrity and high resistance to heat caused by electrical arcs. When the solenoid 101 is energized, the solenoid plunger 125 moves in the direction of "A" closing the contacts 64, 66, 68 and 72. It should be appreciated that when contacts 64, 66, 68 and 72 close, auxiliary contacts 62 and 67 open. FIGS. 8, 9, 10 and 14 show the auxiliary contacts 62 and 67.

Brushes 130 are allowed to swivel via pins 132. The brush holder 127 includes pockets 130 in which springs are located (see FIG. 5). The springs exert pressure on the brushes 130 and equalize the pressure on the contacts. The brush holder 127 moves with the solenoid plunger 125. FIGS. 4, 5, 7, 8, 10-12, and 14-16 show a top view of the PCB 13 including various components.

It should be noted that the auxiliary contacts 62 and 67 are structured and arranged so that when the primary contacts 64 and 68 are open the auxiliary contacts 62 and 67 are closed and vice versa. (see FIGS. 7-15).

FIGS. 6, 13, and 17-23 depict an embodiment of the present invention in which the brush holder 127 (see FIG. 20) moves as a single piece. Springs 129 disperse an opposing force to enable the contacts to close evenly. For example, primary contacts 64, and 68 will close substantially at the same time. If any one of the contacts close earlier than others, the force of the springs 129 will not be balanced. The spring 129 having the greatest force will exert pressure to align the brush holder so that the contacts mate evenly.

Figure 24:
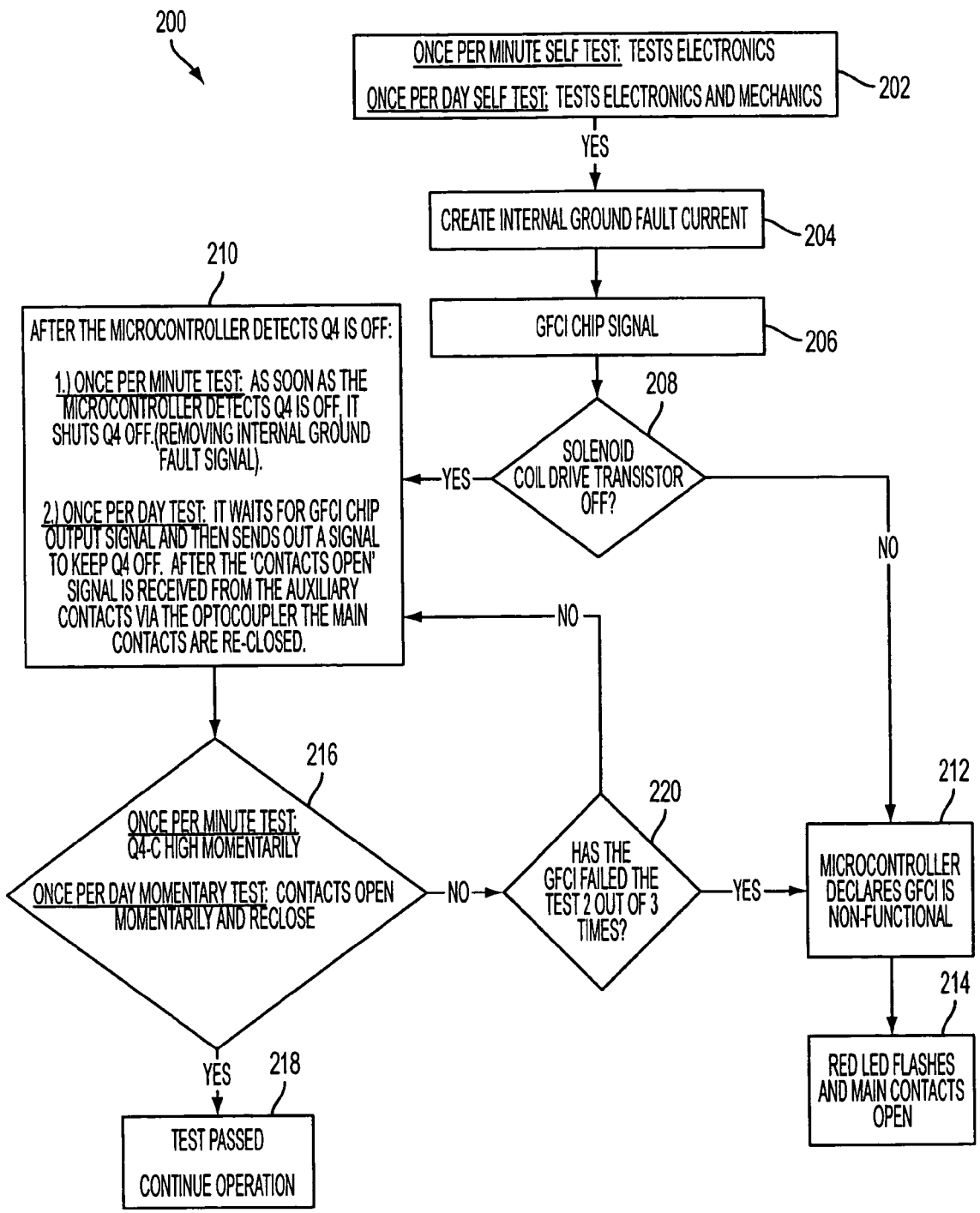
FIG. 24 is a flow chart of an example of a method for performing a self-test in accordance with an embodiment of the present invention.

FIG. 24 is a flow chart of an example of a method for performing a self-test in accordance with an embodiment of the present invention. The method 200 is initiated at 202 where a once per minute or once per day self-test is initiated to test the electronics and mechanics of the GFCI device 10.

At step 204, an internal ground fault is initiated by the microprocessor 104. That is, microprocessor 104 puts pin 112 high to activate transistor 48 which causes a fault to be detected by sense transformer 54.

At step 206, the GFCI chip 100 detects the fault signal from the sense transformer and places a trip signal on pin 102 to activate transistor 96. The activation of transistor 96 inhibits the Darlington transistor 94 causing the collector of transistor 94B to rise.

At step 208, a determination is made as to whether the solenoid coil drive transistor, which is transistor 48, is off. If step 208 is answered affirmatively, the method 200 proceeds to step 210.

At step 210, at least one of two conditions occur. For a once per minute test, when the microprocessor 104 detects that transistor 94B is momentarily off, the microprocessor 104 deactivates transistor 48 via pin 112. For the once per day test, the microprocessor waits for the GFCI chip output signal from pin 102. The microprocessor 104 then sends out a signal via pin 114 to main transistor 94B in an off condition. The microprocessor 104 detects that the primary contacts 64 and 68 and face contacts 66 and 72 are open via the closing of auxiliary contacts 62 and 67 and recloses the primary contacts 64 and 68 and the face contacts 66 and 72.

At step 216, a determination is made as to whether, for the once per minute test, the collector of transistor 94B was momentarily high or, for the once per day test, did the primary contacts 64 and 68 and the face contacts 66 and 72 open and close within 20 ms. If step 216 is answered affirmatively, the method 200 proceeds to step 218.

At step 218, a determination is made that the once per minute or once per day test passed. The GFCI device 10 returns to a nonself-test mode of operation until it is time for the next self-test.

If step 216 is answered negatively, the method 200 proceeds to step 220 where a determination is made as to whether the GFCI device 10 failed the self-test 2 out of 3 times. If step 220 is answered negatively, the method 200 returns to step 210.

If step 220 is answered affirmatively or step 208 is answered negatively, the method 200 proceeds to step 212 where the microprocessor determines that the GFCI device 10 is non-functional. That is, the GFCI device cannot consistently detect ground fault conditions and open the primary contacts 64 and 68. The method 200 proceeds to step 214.

At step 214, the microprocessor flashes the red LED 42B and opens the primary contacts 64 and 68.

Figure 25:
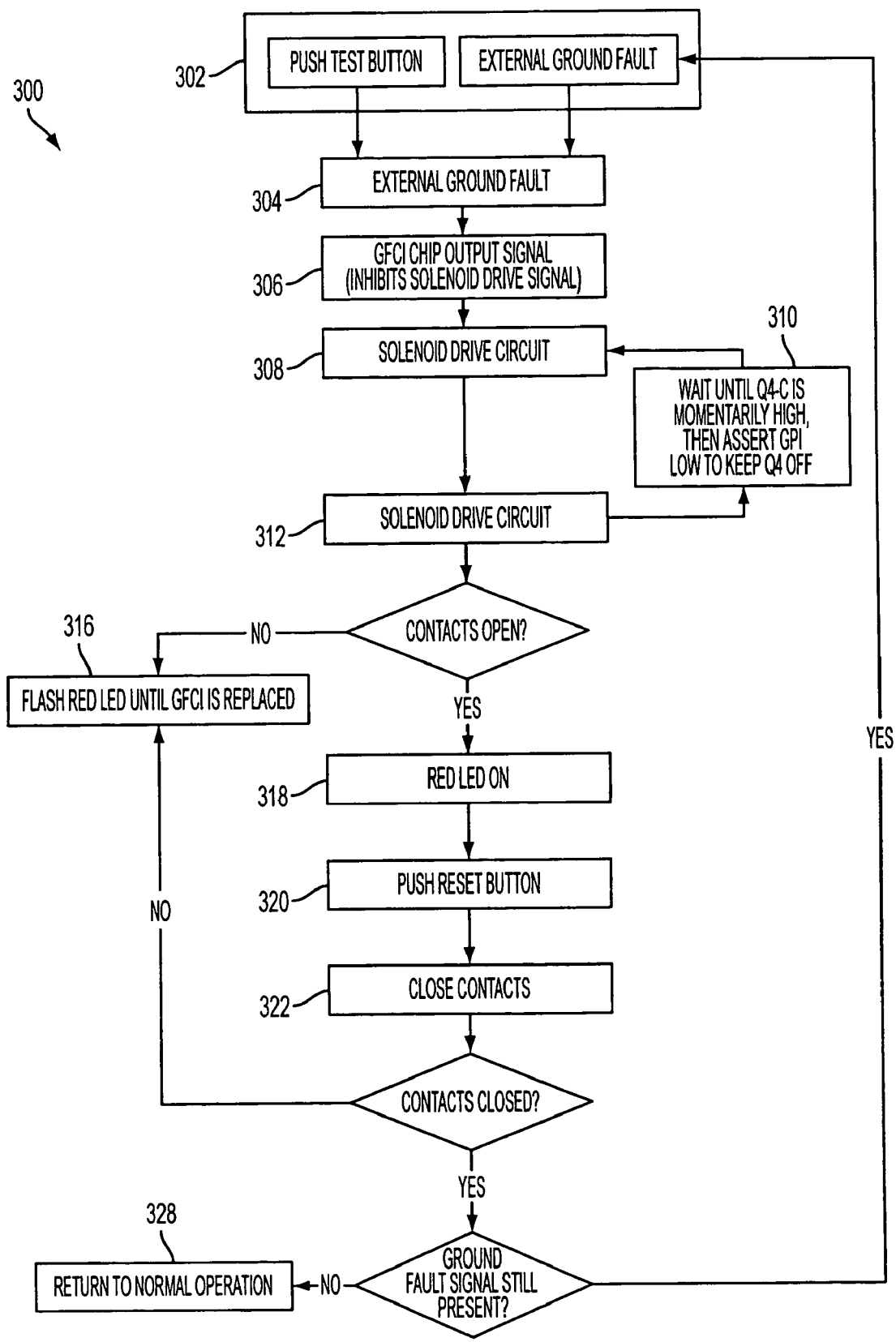
FIG. 25 is a flow chart of an example of a method for performing a ground fault and manual test in accordance with an embodiment of the present invention.

FIG. 25 is a flow chart of an example of a method for performing a ground fault and manual test in accordance with an embodiment of the present invention. The method 300 is initiated at step 302 where either the test button 30 is pressed or an external ground fault is detected. Since both actions lead to the detection of a ground fault, the GFCI chip 100 and the microprocessor 104 cannot tell the difference between the two occurrences. Therefore, they are interchangeable.

At step 304, the ground fault is detected via the sense transformer and the GFCI chip 100. The GFCI chip 100 provides a trip signal to transistor 96, which activates transistor 96.

At step 306, the activation of transistor 96 inhibits the Darlington transistor 94. Specifically, the collector of transistor 94B goes high. The method 300 proceeds to step 308.

At step 308, the Darlington transistor 94, which is the solenoid drive circuit, is monitored by the microprocessor 104. Specifically, the microprocessor 104 determines whether the collector of transistor 94B is momentarily high at step 310. If the collector of transistor 94B is momentarily high, the microprocessor 104 maintains the Darlington transistor 94 in an off state by putting pin 114 low at step 312.

At step 314, a determination is made as to whether primary contacts 64 and 68 and face contacts 66 and 72 are open. If step 314 is answered affirmatively, the method 300 proceeds to step 318 where the red LED 42B is illuminated solid to indicate that contacts 64, 66, 68 and 72 are open.

At step 320, reset button 34 is pressed to close the contacts 64, 66, 68 and 72 at step 322. A determination is made at step 324 as to whether the contacts 64, 66, 68 and 72 have closed. If step 324 is answered negatively or step 314 is answered negatively, the method 300 proceeds to step 316 where the red LED 43B flashes until the GFCI device 10 is replaced.

If step 324 is answered affirmatively, the method 300 proceeds to step 326 where a determination is made as to whether the ground fault signal is still present. If step 326 is answered affirmatively, the method 300 returns to step 302. If step 326 is answered negatively, the method 300 proceeds to step 328 where the GFCI device 10 returns to normal operation.

FIG. 26 is a flow chart of an example of a method of operating a reset button. The microcontroller 104 knows whether the contacts are open due to a ground fault and if the GFCI chip 100 is operating properly. The method 400 is initiated at step 402. The results of pressing the reset button are described. The red LED 42B continues to flash. The contacts 64, 66, 68 and 72 close in order to restore power to the line terminals 39 and 40 and load terminals 37 and 38 if the GFCI device 10 has the capability. It should be noted that closing the contacts 64, 66, 68 and 72 and increasing the rate of flashing the red LED 42B are the only actions that can occur from the pressing of the reset button 34 if there is no ground fault signal and the GFCI device 10 is not operating properly.

Figure 27:
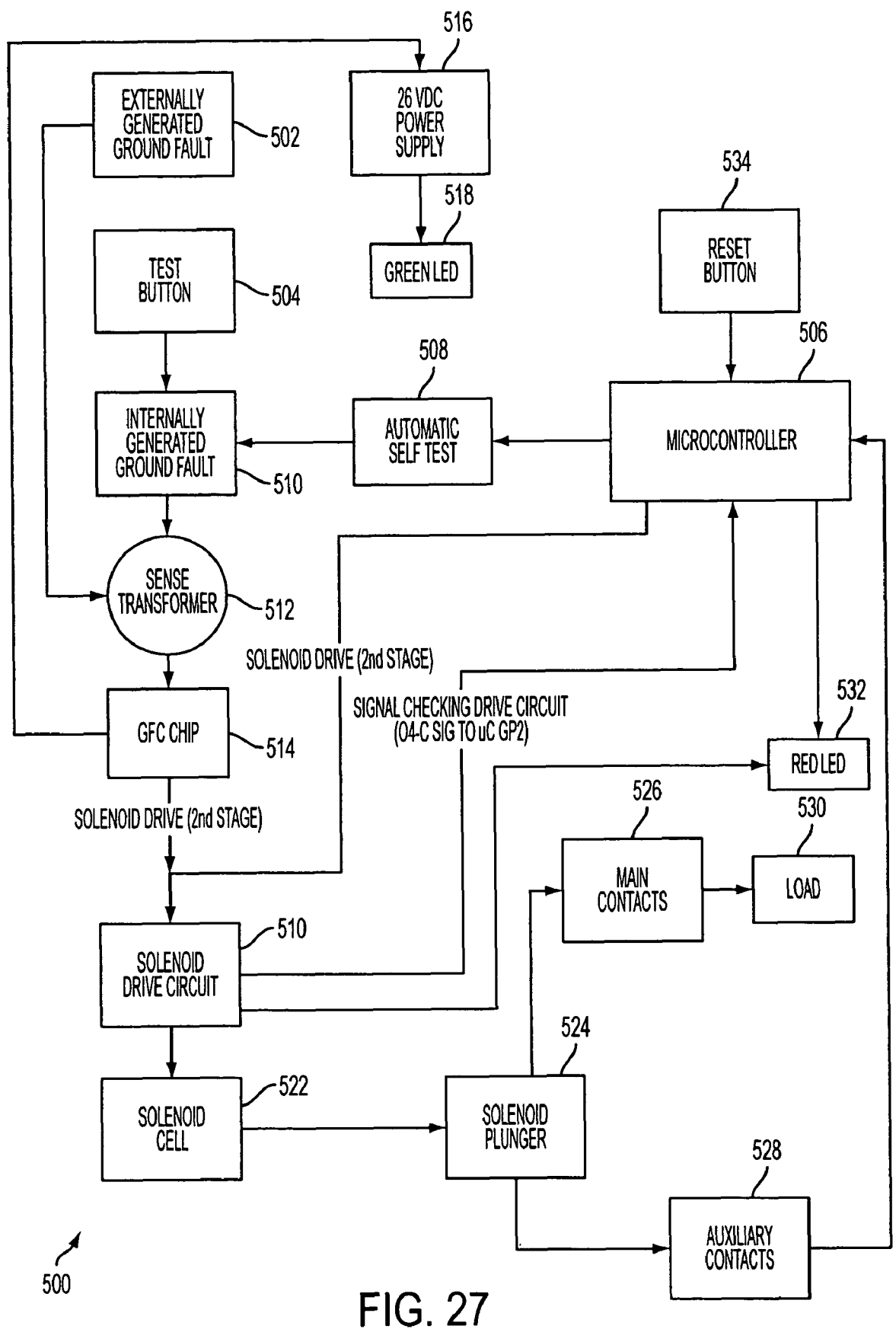
FIG. 27 is a block diagram of a ground fault circuit interrupter circuit configured for responding to an internally generated ground fault and an externally generated ground fault in accordance with an embodiment of the present invention.

FIG. 27 is a block diagram of the ground fault circuit interrupter circuit and mechanics in accordance with an embodiment of the present invention. Block 502 represents where an externally generated ground fault occurs.

The GFCI chip 100 does not know the difference between an internally generated ground fault signal or an externally generated ground fault signal. Therefore, the microprocessor 506 can generate one of two automatic self-tests as indicated at 508. The self-test can be a once per minute test or a once per day test. Either self-test, as well as a manual test performed by a user via a test button 504 can provide an internally generated ground fault signal as indicated 510.

The GFCI chip also supplies 26 volts DC via supply 516, which powers the green LED 42A as indicated by 518 in FIG. 27. The green LED 42A provides an indication to a user that the GFCI device 10 is operating properly and is wired correctly from the line side.

Sense transformer 512 detects an imbalance and provides a signal to GFCI chip 100. GFCI chip 100 provides a trip signal to activate transistor 96. The activation of transistor 96 causes the collector of transistor 94B to rise as indicated 520.

As indicated by 522, the solenoid coil 100 becomes deenergized and the solenoid plunger 524 pulls in. As indicated by 526 and 528, the movement of the plunger causes contacts 64, 66, 68 and 72 to open and auxiliary contacts 62 and 67 to close. The auxiliary contacts 62 and 67 close when the main contacts 64 and 68 open. When auxiliary contacts 62 and 67 are closed, a signal is sent to the microcontroller 104 which that the contacts 64 and 68 have opened. Accordingly, the microprocessor 104 detects the opening of the main contacts 64 and 68.

The opening of the contacts 64, 66, 68 and 72 separates the line from the load 530, and the red LED 42B indicated at 532 in FIG. 27 becomes illuminated. The green LED 42A is extinguished. A user can press the reset button 534 to close the contacts 64, 66, 68 and 72.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A self testing fault detector and interrupter having a line side and a load side and a conductive path therebetween, said apparatus comprising:
   a solenoid, adapted to move a plurality of contacts disposed in said conductive path from a first position to a second position when said self testing fault detector is powered from the line side;
   a programmable processor programmed to energize said solenoid by activating a first switch using a first output thereof for a selected period of time determined by the processor and to maintain said solenoid in said energized state by activating a second switch using a second output thereof after said selected period of time has elapsed and deactivating said first switch; and
   a Ground Fault Circuit Interrupter (GFCI) chip, configured to detect an occurrence of a ground fault, and having an output to said second switch to control deenergization of said solenoid independently of the processor when a fault condition is detected.

2. The self testing fault detector of claim 1, wherein said first switch and said second switch are transistors, said first switch comprising a first terminal connected to the first output and a second terminal thereof connected to the solenoid, and said second switch comprising a third terminal connected to the second output and a fourth terminal thereof connected to the solenoid.

3. The self testing fault detector of claim 1, wherein said second switch comprises a Darlington transistor.

4. The self testing fault detector of claim 1, wherein said first switch is activated for about 10 ms, said second switch is activated and said first switch is deactivated.

5. The self testing fault detector of claim 1, wherein said programmable processor performs a periodic test.

6. The self testing fault detector of claim 5, wherein said programmable processor performs at least one of said test at one minute intervals and daily intervals.

7. The self testing fault detector of claim 5, wherein said periodic test detects at least one of electrical functionality and mechanical functionality of said self testing fault detector.

8. The self testing fault detector of claim 1, further including an alarm indicator.

9. The self testing fault detector of claim 8, wherein said alarm indicator includes a green LED to indicate normal operation of said self testing fault detector.

10. The self testing fault detector of claim 8, wherein said alarm indicator includes a red LED to indicate at least one of three conditions.

11. The self testing fault detector of claim 10, wherein said three conditions comprise at least one of a trip condition, a receptacle mode of operation, and a power denial to load state.

12. The self testing fault detector of claim 8, wherein said processor powers said alarm indicator.

13. The self testing fault detector of claim 8, wherein said alarm indicator comprises a power indicator.

14. The self testing fault detector of claim 1, wherein said first position comprises an open position and said second position comprises a closed position.

15. The self testing fault detector of claim 1, wherein said self testing fault detector comprises at least one of an arc fault circuit interrupter and ground fault circuit interrupter.

16. The self testing fault detector of claim 1, wherein the programmed processor is programmed to maintain said solenoid in the deenergized state by deactivating said second switch when said programmed processor detects that said plurality of contacts are in said first position.

17. The self testing fault detector of claim 1, wherein the GFCI chip comprises a dual function regulator adapted to perform powering internal circuitry of the GFCI chip and powering the processor.

18. A self testing fault interrupter apparatus having line terminals and load terminals and a conductive path therebetween, said apparatus comprising:
a fault sensing transformer, adapted to detect a fault condition in said conductive path;
a solenoid, adapted to move a plurality of contacts disposed in said conductive path from a first position when said solenoid is deenergized or to a second position when said solenoid is energized;
a microprocessor; and
a fault detection chip comprising a first output connected to a switch circuit for the solenoid, and adapted to place said solenoid in an initial deenergized state and place said contacts in said first position independently of the microprocessor when a fault condition is detected by said fault sensing transformer;
wherein said microprocessor comprises a second output connected to the switch circuit for the solenoid, and is adapted to maintain said solenoid in a deenergized state when said microprocessor detects that said contacts are in said first position.

19. The self testing fault interrupter apparatus of claim 18, wherein said microprocessor is adapted to perform a periodic test.

20. The self testing fault interrupter apparatus of claim 18, wherein said microprocessor performs at least one of said test at one minute intervals and daily intervals.

21. The self testing fault interrupter apparatus of claim 19, wherein said periodic test detects at least one of electrical functionality and mechanical functionality of said self testing fault interrupter apparatus.

22. A self testing fault detector and interrupter having a line side and a load side and a conductive path therebetween, said apparatus comprising:
a solenoid, adapted to move a plurality of contacts disposed in said conductive path from a first position to a second position when said self testing fault detector and interrupter is powered from the line side; and
a processor, adapted to energize said solenoid using a first switch and to maintain said solenoid in said energized state using a second switch;
wherein said processor performs a periodic test, said periodic test detects at least one of electrical functionality and mechanical functionality of said self testing fault detector and interrupter and, if said self testing fault detector and interrupter is determined to be inoperable, said self testing fault detector and interrupter is configured to selectively operate in a power denial to load state and a receptacle mode of operation state depending on which state is selected, the receptacle mode of operation state corresponding to when power is provided to a load but said processor does not operate the solenoid to protect against a fault.

23. The self testing fault detector and interrupter of claim 22, further comprising a reset input device to reset the plurality of contacts to the second position from the first position, wherein selecting the receptacle mode of operation state comprises activating the reset input device following deenergization of said solenoid.

24. A self testing fault detector and interrupter having a line side and a load side and a conductive path therebetween, said apparatus comprising:
a solenoid, adapted to move a plurality of contacts disposed in said conductive path from a first position to a second position when said self testing fault detector and interrupter is powered from the line side;
a processor, adapted to energize said solenoid using a first switch and to maintain said solenoid in said energized state using a second switch; and
an alarm indicator;
wherein the alarm indicator comprises a red LED that flashes at a first rate when said self testing fault detector and interrupter is in a power denial to load state and at a second rate when said self testing fault detector is operating in a receptacle mode of operation depending on which state is selected, the receptacle mode of operation state corresponding to when power is provided to a load but said processor does not operate the solenoid to protect against a fault.

25. A self testing fault detector and interrupter having a line side and a load side and a conductive path therebetween, said apparatus comprising:
a solenoid, adapted to move a plurality of contacts disposed in said conductive path from a first position to a second position when said self testing fault detector and interrupter is powered from the line side;

a processor, adapted to energize said solenoid using a first switch and to maintain said solenoid in said energized state using a second switch;

wherein the plurality of contacts comprises a pair of primary contacts, a pair of auxiliary contacts and a pair of face contacts and the primary contacts are configured to be open when the auxiliary contacts are closed and to be closed when the auxiliary contacts are open; and wherein said processor is programmed to perform a self-test by controlling the solenoid to deenergize, detecting when the primary contacts are open via closure of the auxiliary contacts, and maintaining the primary contacts open for a selected period of time to validate a selected signal generated when opening of the primary contacts while avoiding disruption operation of a load powered via the self testing fault detector and interrupter.

26. The self testing fault detector and interrupter of claim 25, wherein, during initial powering of the self testing fault detector and interrupter, the primary contacts are open and the auxiliary contacts are closed.

27. The self testing fault detector and interrupter of claim 25, wherein the primary contacts are closed and the auxiliary contacts are opened during initial powering of the self testing fault detector after the processor detects that the primary contacts are open and the auxiliary contacts are closed.

28. A line powered self testing fault protection device having a line side and a load side and a conductive path therebetween, said apparatus comprising:

a solenoid, adapted to move a plurality of contacts disposed in said conductive path from a first position to a second position;

a fault detector, adapted to energize said solenoid to place said contacts in said first position;

a processor, adapted to energize said solenoid to place said contacts in said second position via a switch; and an alarm indicator, adapted to indicate at least one of a presence of a fault, a presence of electrical power on the line side of said line powered self testing fault protection device, and an operational state of said line powered self testing fault protection device;

wherein said operational state comprises a receptacle mode corresponding to when power is provided to a load but said processor does not operate the solenoid to protect against a fault.

* * * * *